United States Patent
Matsunobu et al.

(10) Patent No.: US 9,013,570 B2
(45) Date of Patent: Apr. 21, 2015

(54) MICROSCOPE AND AREA DETERMINATION METHOD

(75) Inventors: Goh Matsunobu, Kanagawa (JP); Takamichi Yamakoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 808 days.

(21) Appl. No.: 13/169,277

(22) Filed: Jun. 27, 2011

(65) Prior Publication Data
US 2012/0002034 A1 Jan. 5, 2012

(30) Foreign Application Priority Data

Jul. 2, 2010 (JP) ................ P2010-152367

(51) Int. Cl.
| G02B 21/26 | (2006.01) |
| G06K 9/32 | (2006.01) |
| G02B 21/12 | (2006.01) |
| G02B 21/36 | (2006.01) |
| G06K 9/00 | (2006.01) |

(52) U.S. Cl.
CPC .............. *G02B 21/125* (2013.01); *G02B 21/26* (2013.01); *G02B 21/365* (2013.01); *G06K 9/00127* (2013.01); *G06K 9/3216* (2013.01); *G06K 2009/3225* (2013.01)

(58) Field of Classification Search
None
See application file for complete search history.

(56) References Cited

U.S. PATENT DOCUMENTS

| 4,407,008 | A | 9/1983 | Schmidt et al. |
| 4,720,191 | A | 1/1988 | Siegel et al. |
| 6,031,930 | A | 2/2000 | Bacus et al. |
| 6,101,265 | A | 8/2000 | Bacus et al. |
| 6,226,392 | B1 | 5/2001 | Bacus et al. |
| 6,272,235 | B1 | 8/2001 | Bacus et al. |
| 6,396,941 | B1 | 5/2002 | Bacus et al. |
| 6,404,906 | B2 | 6/2002 | Bacus et al. |
| 6,522,774 | B1 | 2/2003 | Bacus et al. |
| 6,674,881 | B2 | 1/2004 | Bacus et al. |

(Continued)

FOREIGN PATENT DOCUMENTS

| EP | 2 053 535 | 4/2009 |
| JP | 05-215969 | 8/1993 |

(Continued)

OTHER PUBLICATIONS

European Patent Office, Partial European Search Report, issued in connection with European Patent Application No. 11171525.6, mailed on Oct. 13, 2011. (5 pages).

(Continued)

*Primary Examiner* — Jay Patel
*Assistant Examiner* — Reza Aghevli
(74) *Attorney, Agent, or Firm* — K&L Gates LLP

(57) ABSTRACT

Provided is a microscope including: dark field illumination and bright field illumination which illuminate a preparat where a sample mounted on a slide glass is covered with a cover glass and a mounting agent; an image capturing unit which acquires a dark field image by image-capturing the preparat illuminated by the dark field illumination and which acquires a bright field image by image-capturing the preparat illuminated by the bright field illumination; and a magnified portion image acquisition area determination unit which detects an edge of the cover glass in the preparat based on the dark field image and the bright field image acquired by the image capturing unit and determines an internal area of the detected edge of the cover glass as a magnified portion image acquisition area of the sample.

12 Claims, 21 Drawing Sheets

(56) References Cited

U.S. PATENT DOCUMENTS

| | | | |
|---|---|---|---|
| 6,674,884 | B2 | 1/2004 | Bacus et al. |
| 6,775,402 | B2 | 8/2004 | Bacus et al. |
| 6,809,862 | B2 * | 10/2004 | Behnsen et al. ............ 359/392 |
| 7,110,586 | B2 | 9/2006 | Bacus et al. |
| 7,146,372 | B2 | 12/2006 | Bacus et al. |
| 7,149,332 | B2 | 12/2006 | Bacus et al. |
| 7,542,596 | B2 | 6/2009 | Bacus et al. |
| 7,782,452 | B2 * | 8/2010 | Mehanian et al. ......... 356/237.2 |
| 7,856,131 | B2 | 12/2010 | Bacus et al. |
| 7,885,447 | B2 * | 2/2011 | Oshiro et al. ................ 382/133 |
| 8,098,956 | B2 * | 1/2012 | Tatke et al. .................. 382/284 |
| 2005/0244459 | A1 * | 11/2005 | DeWitt et al. ................ 424/426 |
| 2005/0254696 | A1 | 11/2005 | Bacus et al. |
| 2006/0050376 | A1 * | 3/2006 | Houston et al. ............. 359/392 |
| 2007/0269085 | A1 | 11/2007 | Oshiro et al. |
| 2008/0219890 | A1 * | 9/2008 | Lawson et al. ................ 422/81 |
| 2008/0240613 | A1 | 10/2008 | Dietz et al. |
| 2009/0059215 | A1 | 3/2009 | Mehanian et al. |
| 2009/0141126 | A1 * | 6/2009 | Soenksen ...................... 348/79 |
| 2009/0305335 | A1 * | 12/2009 | Kuusisto et al. ............... 435/30 |

FOREIGN PATENT DOCUMENTS

| | | |
|---|---|---|
| JP | 10-506461 | 6/1998 |
| JP | 11-133311 | 5/1999 |
| JP | 2000-508095 | 6/2000 |
| JP | 2003-246176 | 9/2003 |
| JP | 2007-310231 | 11/2007 |
| WO | 97/22946 | 6/1997 |

OTHER PUBLICATIONS

European Patent Office, Extended European Search Report, issued in connection with European Patent Application No. 11171525.6, dated on Feb. 2, 2012. (11 pages).

European Patent Office, Communication pursuant to Article 94(3) EPC, issued in connection with European Patent Application No. 11171525.6, dated Jan. 24, 2013. (5 pages).

Japanese Office Action issued Mar. 18, 2014 for corresponding Japanese Appln. No. 2010-152367.

* cited by examiner

MICROSCOPE AND AREA DETERMINATION METHOD

CROSS REFERENCES TO RELATED APPLICATIONS

The present application claims priority to Japanese Priority Patent Application JP 2010-152367 filed in the Japan Patent Office on Jul. 2, 2010, the entire content of which is hereby incorporated by reference.

BACKGROUND

The present application relates to a microscope having an image processing unit which determines a processing area in image data and an area determination method of determining a processing area in image data.

With the advent of the Internet, telepathology in which a doctor at a remote site performs pathological diagnosis by using a network has been provided. Due to the telepathology, a pathologist at a remote site manipulates microscopic images of body tissues to make a medical diagnosis. Recently, broadband telecommunication and large-capacity storage have been implemented, such that digital data of an entire tissue on a slide glass may be obtained. In addition, digital pathology in which pathological information is managed and analyzed has been employed, so that the improvement of the quality and efficiency of pathological practice is expected. For example, a virtual slide obtained as digital data of the slide glass by the digital pathology may be used not only as information exchanged between pathologists but also as teaching materials. In addition, in digital pathology, the virtual slide may be automatically produced by a virtual slide apparatus, so that it is possible to improve the efficiency of the task.

For example, as illustrated in FIG. 24, the virtual slide apparatus illuminates the entire slide glass 16, on which a living body sample is mounted, with a backlight 15 disposed at the opposite side with respect to the image capturing device 13. Next, the entire slide glass 16 is image-captured by an image capturing device 13 through an image forming lens 12, so that a digital image (virtual slide) is obtained. A label 16a where information such as a name of the living body sample on the slide glass 16 is written, a cover glass 16b covering the living body sample, or the like is disposed in the slide glass 16. The produced digital image of the entire slide glass 16 is stored in a hard disk drive or a removable media. A user may observe the stored image by using a personal computer 11 or the like. Since the living body samples are managed as digital images, it is easy to search for the desired living body sample among a large number of living body samples and to observe the desired living body sample. In addition, even at a remote site, it is possible to observe the living body sample (for example, refer to Japanese Unexamined Patent Application Publication No. 11-133311).

When the virtual slide is produced, first, the virtual slide apparatus captures a thumbnail image (slightly-magnified image) to determine an image capturing area where a high-magnification image (largely-magnified image) is to be acquired. The image capturing area may be detected by using a well-recognized automatic area detection algorithm. For example, as illustrated in FIG. 25, a portion of the area including the living body sample (hereinafter, referred to as a "sample") 21 in the thumbnail image is determined as the image capturing area 22. Next, the virtual slide apparatus performs acquisition of the high-magnification image on the determined image capturing area.

SUMMARY

However, in the virtual slide apparatus in the related art, there are problems in that the edge of the cover glass 16b is misrecognized as the sample 21 and, as illustrated in FIG. 26, the area 23 which does not include the sample 21 in the periphery of the thumbnail image is misrecognized as the image capturing area. Since the image other than the sample 21 is also acquired, the scan time for the slide is increased, and large-capacity storage is necessary for storing the virtual slide. Therefore, it is preferable that only the area in the slide, where the sample 21 is mounted, is accurately recognized.

It is desirable to provide a new or improved microscope capable of accurately recognizing an area, in which a high-magnification image is to be acquired, from a thumbnail image and an area determination method.

According to an embodiment, there is provided a microscope including: dark field illumination and bright field illumination which illuminate a preparat where a sample mounted on a slide glass is covered with a cover glass and a mounting agent; an image capturing unit which acquires a dark field image by image-capturing the preparat illuminated by the dark field illumination and which acquires a bright field image by image-capturing the preparat illuminated by the bright field illumination; and a magnified portion image acquisition area determination unit which detects an edge of the cover glass in the preparat based on the dark field image and the bright field image acquired by the image capturing unit and determines an internal area of the detected edge of the cover glass as a magnified portion image acquisition area of the sample.

In the embodiment, the magnified portion image acquisition area determination unit may calculate a position of the edge of the cover glass, which indicates the dark field image, and determine the entire surface of an internal area at a position in the bright field image corresponding to the position of the edge calculated from the dark field image as the magnified portion image acquisition area.

In addition, the magnified portion image acquisition area determination unit may calculate a position of the edge of the cover glass, which indicates the dark field image, perform area determination on an internal area at a position in the bright field image corresponding to the position of the edge calculated from the dark field image, and determine a result of the area determination as the magnified portion image acquisition area.

In the embodiment, the microscope according to the embodiment may further include: a label image acquisition unit which acquires a label image of a label indicating information on the sample, which is attached to the slide glass, from the dark field image; and a thumbnail image output unit which outputs the image in the sample acquisition area of the bright field image and the label image in a correspondence manner.

In addition, the microscope according to the embodiment may further include a noise removing unit which removes noise in the magnified portion image acquisition area based on difference information between the dark field image and the bright field image.

In the embodiment, an LED illumination or a laser may be used as the dark field illumination.

According to another embodiment, there is provided an area determination method including: acquiring a dark field image by image-capturing a preparat which is illuminated by dark field illumination and where a sample mounted on a slide glass is covered with a cover glass and a mounting agent; acquiring a bright field image by image-capturing the preparat which is illuminated by bright field illumination; detecting an edge of the cover glass in the preparat based on the dark field image; and determining the entire surface of an internal area of the detected edge of the cover glass in the bright field image as a magnified portion image acquisition area of the sample.

According to still another embodiment, there is provided an area determination method including: acquiring a dark field image by image-capturing a preparat which is illuminated by dark field illumination and where a sample mounted on a slide glass is covered with a cover glass and a mounting agent; acquiring a bright field image by image-capturing the preparat which is illuminated by bright field illumination; detecting an edge of the cover glass in the preparat based on the dark field image; and performing area determination on an internal area of the detected edge of the cover glass with respect to the bright field image and determining a result of the area determination as the magnified portion image acquisition area of the sample.

According to further still another embodiment, there is provided a microscope including: dark field illumination and bright field illumination which illuminate a preparat where a sample mounted on a slide glass is covered with a cover glass and a mounting agent; an image capturing unit which acquires a dark field image by image-capturing the preparat illuminated by the dark field illumination and which acquires a bright field image by image-capturing the preparat illuminated by the bright field illumination; and a magnified portion image acquisition area determination unit which detects a noise component of the cover glass of the preparat based on the dark field image and the bright field image acquired by the image capturing unit, removes the detected noise component from the bright field image, and determines the result as a magnified portion image acquisition area of the sample.

In the embodiment, the noise component may be, for example, the edge of the cover glass, the mounting agent, attached foreign materials, or the like.

According to further still another embodiment, there is provided a microscope including: dark field illumination and bright field illumination which illuminate a preparat where a sample mounted on a slide glass is covered with a cover glass and a mounting agent; an image capturing unit which acquires a dark field image by image-capturing the preparat illuminated by the dark field illumination and which acquires a bright field image by image-capturing the preparat illuminated by the bright field illumination; and a magnified portion image acquisition area determination unit which detects a mounting agent oozing area of the cover glass in the preparat based on the dark field image and the bright field image acquired by the image capturing unit and determines an internal area of the detected mounting agent oozing area as a magnified portion image acquisition area of the sample.

In the embodiment, the magnified portion image acquisition area determination unit may calculate a position of the mounting agent oozing area, which indicates the dark field image, and determine the entire surface of an internal area at a position in the bright field image corresponding to the position of the mounting agent oozing area, which is calculated from the dark field image, as the magnified portion image acquisition area.

In addition, the magnified portion image acquisition area determination unit may calculate a position of the mounting agent oozing area, which indicates the dark field image, perform area determination on an internal area at a position in the bright field image corresponding to the position of the mounting agent oozing area, which is calculated from the dark field image, and determine a result of the area determination as the magnified portion image acquisition area.

In the embodiment, the microscope according to the present applicationmay further include: a label image acquisition unit which acquires a label image of a label indicating information on the sample, which is attached to the slide glass, from the dark field image; and a thumbnail image output unit which outputs the image in the sample acquisition area of the bright field image and the label image in a correspondence manner.

In addition, the microscope according to the present applicationmay further include a noise removing unit which removes noise in the magnified portion image acquisition area based on difference information between the dark field image and the bright field image.

In the embodiment, an LED illumination or a laser may be used as the dark field illumination.

According to further still another embodiment, there is provided an area determination method including: acquiring a dark field image by image-capturing a preparat which is illuminated by dark field illumination and where a sample mounted on a slide glass is covered with a cover glass and a mounting agent; acquiring a bright field image by image-capturing the preparat which is illuminated by bright field illumination; detecting a mounting agent oozing area in the preparat based on the dark field image; and determining the entire surface of an internal area of the detected mounting agent oozing area in the bright field image as a magnified portion image acquisition area of the sample.

According to further still another embodiment, there is provided an area determination method including: acquiring a dark field image by image-capturing a preparat which is illuminated by dark field illumination and where a sample mounted on a slide glass is covered with a cover glass and a mounting agent; acquiring a bright field image by image-capturing the preparat which is illuminated by bright field illumination; detecting a mounting agent oozing area in the preparat based on the dark field image; and performing area determination on an internal area of the detected mounting agent oozing area in the bright field image and determining a result of the area determination as a magnified portion image acquisition area of the sample.

As described hereinbefore, according to the embodiments of the present disclosure, it is possible to provide a microscope capable of accurately recognizing an area, in which a high-magnification image is to be acquired, from a thumbnail image and an area determination method.

Additional features and advantages are described herein, and will be apparent from the following Detailed Description and the figures.

DETAILED DESCRIPTION

Figure 1:
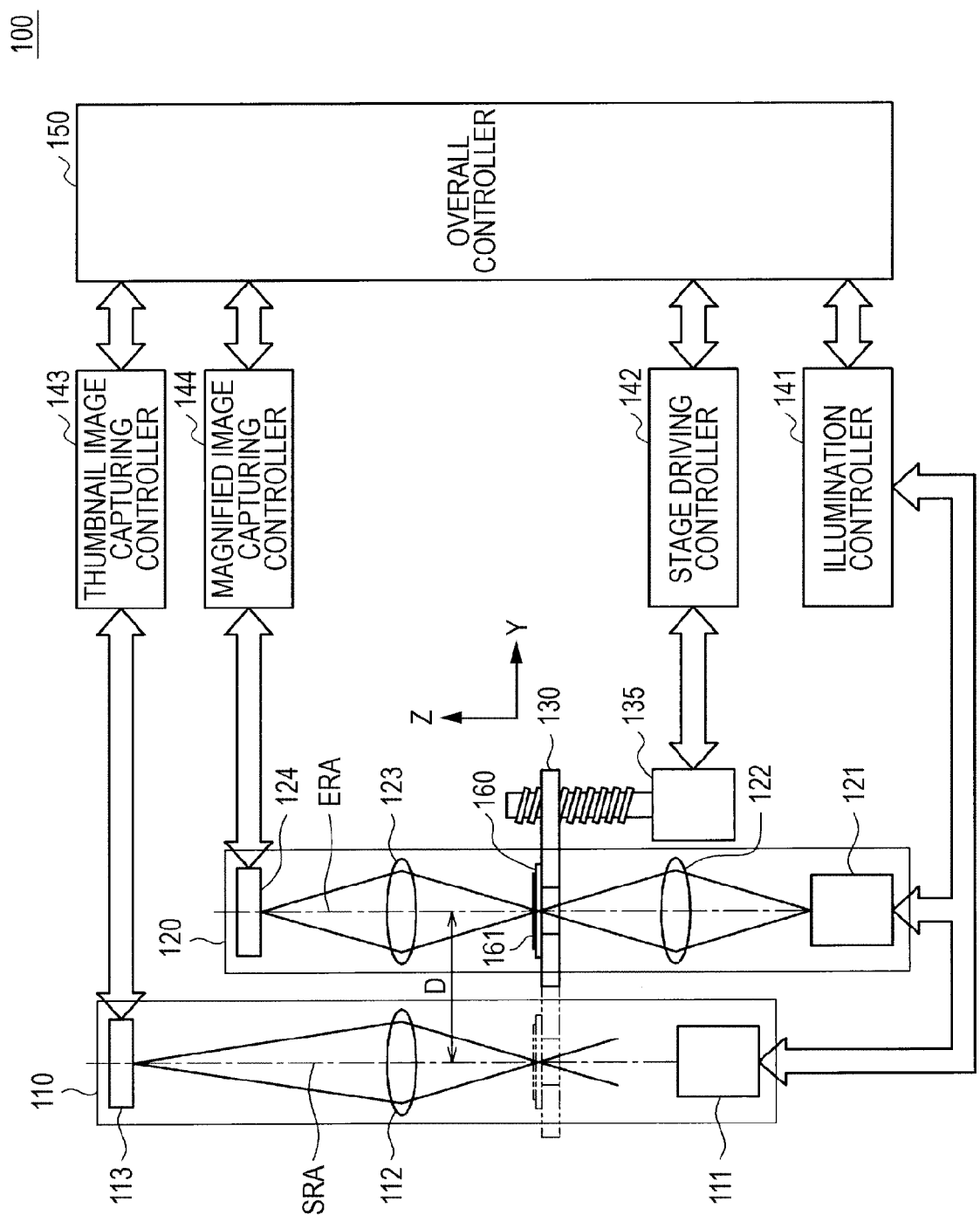
FIG. 1 is a diagram illustrating a configuration of a microscope according to an embodiment.

Hereinafter, exemplary embodiments of the present application will be described in detail with reference to the accompanying drawings. In addition, in the specification and the drawings, elements having substantially the same functions and configurations are denoted by the same reference numeral, and the description thereof is omitted.

In addition, the description will be made in the following order.

1. Configuration of Microscope
2. Virtual Slide Production Process
3. Example of Hardware Configuration <1. Configuration of Microscope>

First, a configuration of a microscope 100 according to an embodiment will be described with reference to FIG. 1. FIG. 1 is a diagram illustrating a configuration of the microscope 100 according to an embodiment.

[Whole Configuration]

As exemplarily illustrated in FIG. 1, the microscope 100 according to the embodiment includes a thumbnail image capturing unit 110 which captures an image (hereinafter, this image is referred to as a thumbnail image) of the entire preparat PRT where a living body sample is disposed and a magnified image capturing unit 120 which captures an image (hereinafter, this image is referred to as a magnified image) formed by enlarging the living body sample with a predetermined magnification ratio.

The preparat PRT is obtained by fixing a living body sample, which includes tissue slices of connective tissues such as blood, epithelial tissues, tissues having the above two tissues, or the like or smear cells, on a slide glass 160 by using a predetermined fixing method. If necessary, various staining processes are performed on the tissue slices or the smear cells. The staining includes general staining represented by HE (hematoxyline and eosin) staining, Giemsa staining, Papnicolaou staining, or the like and fluorescence staining such as FISH (Fluorescence In-Situ Hybridization) or an enzyme antibody method.

In addition, the preparat PRT may be attached with a label (denoted by reference number 162 in FIG. 3) where additional information (for example, a name of a person sampling the sample, a sampling date, a staining type, and the like) for specifying the corresponding living body sample is written. In addition, the preparat PRT is configured to include a slide glass 160 on which the living body sample is mounted, a cover glass 161 which covers the living body sample, a label 162, and the like.

Figure 2:
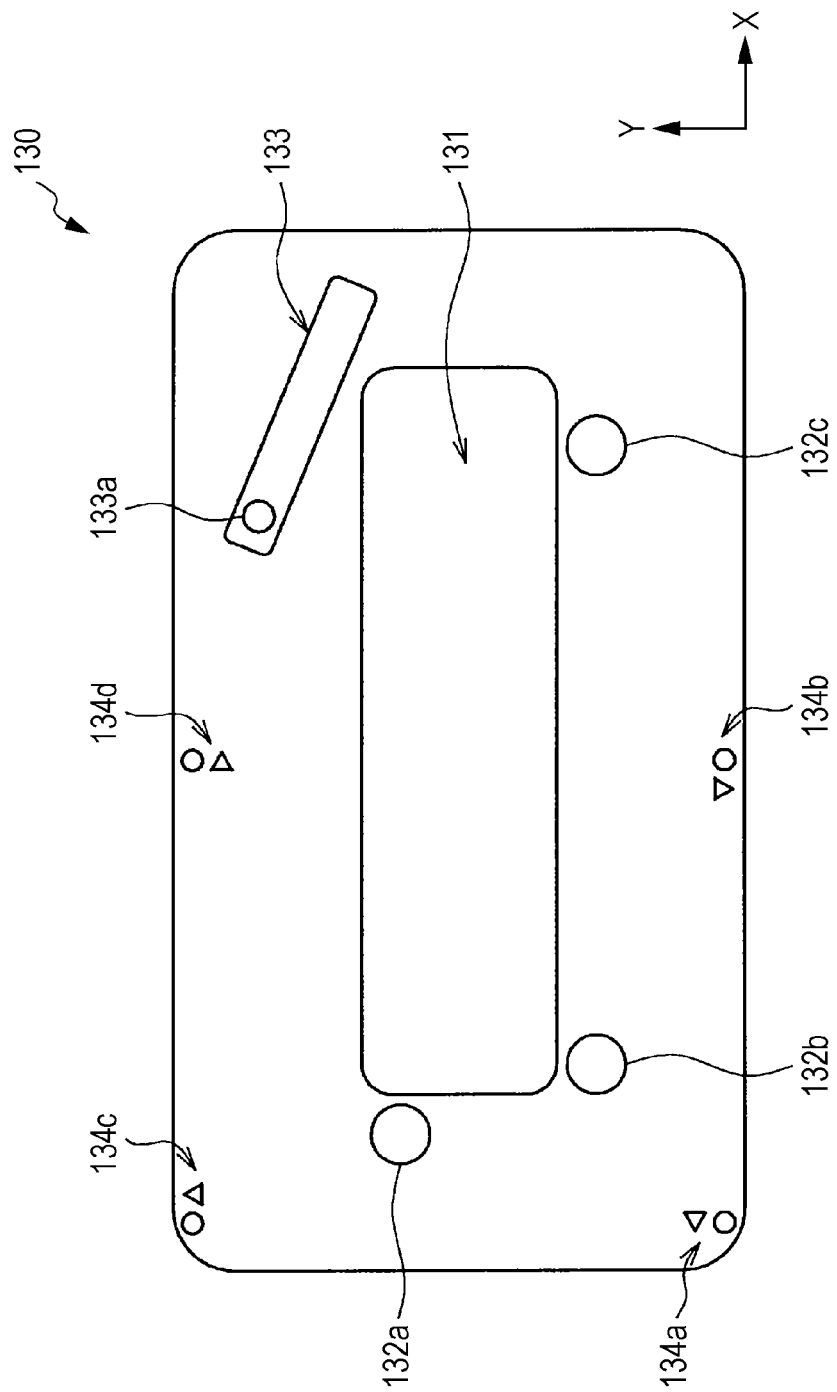
FIG. 2 is a diagram illustrating a configuration of a stage according to the embodiment.
Figure 3:
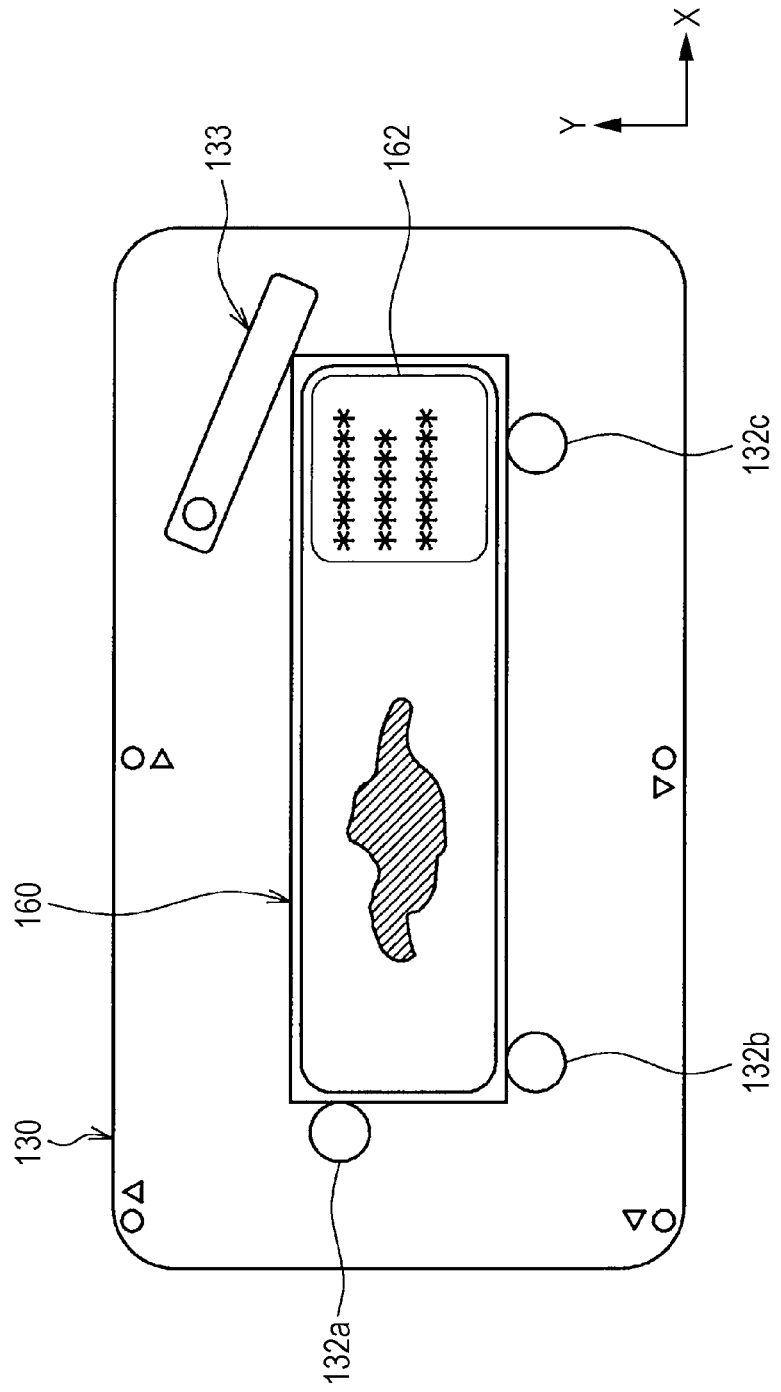
FIG. 3 is a diagram illustrating a stage on which a preparat is mounted.

A stage 130 on which the aforementioned preparat PRT is to be mounted is installed in the microscope 100 according to the embodiment. As illustrated in FIG. 2, the stage 130 is provided with an aperture portion 131 which is slightly smaller than the preparat PRT. The protrusions 132a to 132c which fasten the side surfaces of the preparat PRT are disposed around the aperture portion 131 of the stage 130. The protrusion 132a supports one short side of the preparat PRT disposed on the stage 130 corresponding to the aperture portion 131, and the protrusions 132b and 132c support one long side of the preparat PRT. In addition, a suppressing portion 133 which is biased to the aperture portion side rotatably around a point 133a as a center of the rotation is disposed at the corner opposite to the corner formed by the two sides supported by the protrusions 132a to 132c. Therefore, as illustrated in FIG. 3, the preparat PRT may be fastened to the stage 130 by the protrusions 132a to 132c and the suppressing portion 133.

Markers 134a to 134d for recognizing the position of the stage 130 from the image captured by the image capturing devices 113 and 124 are attached on the mounting plane of the stage 130 on which the preparat PRT is mounted. As illustrated in FIG. 2, the markers 134a to 134d may be configured so that, for example, "O" and "Δ" are disposed in different positional relationships.

A stage driving mechanism 135 is a mechanism for moving the stage 130 in various directions. By the stage driving mechanism 135, the stage 130 may be freely moved in the direction (X axis-Y axis direction) parallel to the stage plane and the direction (Z axis direction) perpendicular to the stage plane.

[Thumbnail Image Capturing Unit]

As illustrated in FIG. 1, the thumbnail image capturing unit 110 mainly includes a light source 111, an object lens 112, and an image capturing device 113.

The light source 111 is disposed in the plane side opposite to the preparat mounting plane of the stage 130. The light source 111 may switchably illuminate the light (hereinafter, referred to as a bright field illumination light or, simply, an illumination light) which is illuminated on a living body sample subject to general staining and the light (hereinafter, referred to as a dark field illumination light) which is illuminated on a living body sample subject to special staining. In addition, the light source 111 may be configured to be capable of illuminating only one of the bright field illumination light and the dark field illumination light. In this case, as the light source 111, two types of light sources including a light source illuminating the bright field illumination light and a light source illuminating the dark field illumination light are disposed. In addition, the light source illuminating the dark field illumination light may be disposed on the same plane as the preparat mounting plane of the stage 130.

The object lens 112 having a predetermined magnification ratio with the normal line of the preparat mounting plane at the reference position of the thumbnail image capturing unit 110 as an optical axis SRA is disposed in the side of the preparat mounting plane of the stage 130. The transmitting light which transmits the preparat PRT disposed on the stage 130 is collected by the object lens 112 and allows an image to be formed on the image capturing device 113 disposed in the rear side of the object lens 112 (in other words, in the proceeding direction of the illumination light).

The light (in other words, the transmitting light transmitting the entire preparat PRT) in the image capturing range enclosing all the portions of the preparat PRT mounted on the preparat mounting plane of the stage 130 allows an image to be formed on the image capturing device 113. The image formed on the image capturing device 113 becomes the thumbnail image which is a microscopic image obtained by image-capturing all the portions of the preparat PRT.

[Magnified Image Capturing Unit]

As illustrated in FIG. 1, the magnified image capturing unit 120 mainly includes a light source 121, a condenser lens 122, an object lens 123, and an image capturing device 124. In addition, the magnified image capturing unit 120 may further include a field diaphragm (not shown).

The light source 121 illuminates the bright field illumination light and is disposed in the side of the opposite surface with respect to the preparat mounting plane of the stage 130. In addition, a light source (not shown) which illuminates the dark field illumination light is disposed at the position (for example, the side of the preparat mounting plane) different from the position of the light source 121.

The condenser lens 122 is a lens which collects the bright field illumination light illuminated from the light source 121 or the dark field illumination light illuminated from the light source for the dark field illumination and guides the illumination light to the preparat PRT on the stage 130. The condenser lens 122 with the normal line of the preparat mounting plane at the reference position of the magnified image capturing unit 120 as an optical axis ERA is disposed between the light source 121 and the stage 130.

The object lens 123 having a predetermined magnification ratio with the normal line of the preparat mounting plane at the reference position of the magnified image capturing unit 120 as the optical axis ERA is disposed in the side of the preparat mounting plane of the stage 130. In the magnified image capturing unit 120, the object lens 123 is appropriately switched, so that it is possible to magnify and image-capture the living body sample at various magnification ratios. The transmitting light which transmits the preparat PRT disposed on the stage 130 is collected by the object lens 123 and allows an image to be formed on the image capturing device 124 disposed in the rear side of the object lens 123 (in other words, in the proceeding direction of the illumination light).

The image in the image capturing range having predetermined horizontal and vertical widths in the preparat mounting plane of the stage 130 is formed on the image capturing device 124 according to the pixel size of the image capturing device 124 and the magnification ratio of the object lens 123. In addition, since a portion of the living body sample is magnified by the object lens 123, the aforementioned image capturing range is smaller than the image capturing range of the image capturing device 113 of the thumbnail image capturing unit 110.

Herein, as illustrated in FIG. 1, the thumbnail image capturing unit 110 and the magnified image capturing unit 120 are disposed so that the optical axis SRA and the optical axis ERA which are the normal lines at the reference positions thereof are separated from each other by a distance D in the Y axis direction. The distance D is set to such a small distance that a barrel (not shown) supporting the object lens 123 of the magnified image capturing unit 120 does not enter into the image capturing range of the image capturing device 113 and miniaturization is implemented.

In the above description, the image capturing devices disposed in the thumbnail image capturing unit 110 and the magnified image capturing unit 120 may be one-dimensional image capturing devices or two-dimensional image capturing devices.

[Controller]

As illustrated in FIG. 1, controllers for controlling various components of the microscope are connected to the microscope 100 according to the embodiment. More specifically, an illumination controller 141 for controlling various light sources including the light source 111 and the light source 121, which are provided to the microscope 100, is connected to the microscope 100 according to the embodiment, and a stage driving controller 142 for controlling the stage driving mechanism 135 is connected to the stage driving mechanism 135. In addition, a thumbnail image capturing controller 143 is connected to the image capturing device 113 for capturing the thumbnail image, and a magnified image capturing controller 144 is connected to the image capturing device 124 for capturing the magnified image of the living body sample. The controllers are connected to the components, which control is to be performed on, through various data communication lines.

In addition, in the microscope 100 according to the embodiment, a controller (hereinafter, referred to as an overall controller 150) which performs control of the entire microscope is separately disposed, and the controller is connected to the aforementioned various controllers through various data communication lines.

The controllers are implemented by using CPUs (Central Processing Units), ROMs (Read Only Memories), RAMs (Random Access Memories), storage units, communication units, calculation circuits, and the like. Hereinafter, functions of the controllers will be described in brief.

The illumination controller 141 is a processing unit which controls various light sources included in the microscope 100 according to the embodiment. If the information indicating the living body sample illumination method is output from the overall controller 150, the illumination controller 141 performs illumination control of the corresponding light source based on the acquired information indicating the illumination method.

For example, the case where the illumination controller 141 performs control of the light source 111 disposed in the thumbnail image capturing unit 110 is considered. In this case, the illumination controller 141 determines with reference to the information indicating the illumination method which one of a mode where a bright field image is to be acquired (hereinafter, referred to as a bright field mode) and a mode where a dark field image is to be acquired (hereinafter, referred to as a dark field mode) is to be performed. After that, the illumination controller 141 sets parameters according to each mode to the light source 111 to allow the light source 111 to illuminate illumination light appropriate to each mode. Therefore, the illumination light illuminated from the light source 111 is illuminated on all the portions of the living body sample through the aperture portion of the stage 130. In addition, the parameters set by the illumination controller 141 include, for example, an intensity of illumination light, light source type selection, and the like.

In addition, the case where the illumination controller 141 controls the light source 121 disposed in the magnified image capturing unit 120 is considered. In this case, the illumination controller 141 determines with reference to the information indicating the illumination method which one of the bright field mode and the dark field mode is to be performed. After that, the illumination controller 141 sets parameters according to each mode to the light source 121 to allow the light source 121 to illuminate illumination light appropriate to each mode. Therefore, the illumination light illuminated from the light source 121 is illuminated on all the portions of the living body sample through the aperture portion of the stage 130. In addition, the parameters set by the illumination controller 141 include, for example, an intensity of illumination light, light source type selection, and the like.

In addition, it is preferable that the illumination light in the bright field mode is visible light. In addition, it is preferable that the illumination light in the dark field mode is light having a wavelength capable of exciting a fluorescence marker used as a specific staining In addition, in the dark field mode, a background portion of the fluorescence marker is cut out.

The stage driving controller 142 is a processing unit which controls the stage driving mechanism 135 for driving the stage disposed to the microscope 100 according to the embodiment. If the information indicating the living body sample image capturing method is output from the overall controller 150, the stage driving controller 142 controls the stage driving mechanism 41 based on the acquired information indicating the image capturing method.

For example, the case where the thumbnail image is captured by the microscope 100 according to the embodiment is considered. If the information indicating that the thumbnail image of the living body sample is to be captured is output from the overall controller 150, the stage driving controller 142 moves the stage 130 in the stage plane direction (X-Y axis direction) so that all the portions of the preparat PRT are enclosed within the image capturing range of the image capturing device 113. In addition, the stage driving controller 142 moves the stage 130 in the Z axis direction so that all the portions of the preparat PRT are coincident with the focus of the object lens 112.

In addition, the case where the magnified image is captured by the microscope 100 according to the embodiment is considered. If the information indicating that the magnified image of the living body sample is to be captured is output from the overall controller 150, the stage driving controller 142 controls driving of the stage driving mechanism 135 to move the stage 40 in the stage plane direction so that the living body sample is located in a range from a position between the light source 111 and the object lens 112 to a position between the condenser lens 122 and the object lens 123.

In addition, the stage driving controller 142 moves the stage 130 in the stage plane direction (X-Y axis direction) so that a predetermined portion of the living body sample is located in the image capturing range where the image capturing is performed by the image capturing device 124.

Furthermore, the stage driving controller 142 controls driving of the stage driving mechanism 135 to move the stage 130 in the direction (Z axis direction, a depth direction of a tissue slice) perpendicular to the stage plane so that the portion of the living body sample located in a predetermined image capturing range is coincident with the focus of the object lens 123.

The thumbnail image capturing controller 143 is a processing unit which performs control of the image capturing device 113 disposed in the thumbnail image capturing unit 110. The thumbnail image capturing controller 143 sets the parameters according to the bright field mode or the dark field mode to the image capturing device 113. In addition, if the thumbnail image capturing controller 143 acquires an output signal corresponding to the image formed on the image forming plane of the image capturing device 113 which is output from the image capturing device 113, the thumbnail image capturing controller 143 sets the acquired output signal as an output signal corresponding to the thumbnail image. If the thumbnail image capturing controller 143 acquires the output signal corresponding to the thumbnail image, the thumbnail image capturing controller 143 outputs the data corresponding to the acquired signal to the overall controller 150. In addition, the parameters set by the thumbnail image capturing controller 143 include, for example, an exposure start timing, an exposure end timing, and the like.

The magnified image capturing controller 144 is a processing unit which performs control of the image capturing device 124 disposed in the magnified image capturing unit 120. The magnified image capturing controller 144 sets the parameters according to the bright field mode or the dark field mode to the image capturing device 124. In addition, if the magnified image capturing controller 144 acquires an output signal corresponding to the image formed on the image forming plane of the image capturing device 124 which is output from the image capturing device 124, the magnified image capturing controller 144 sets the acquired output signal as an output signal corresponding to the magnified image. If the magnified image capturing controller 144 acquires the output signal corresponding to the magnified image, the magnified image capturing controller 144 outputs the data corresponding to the acquired signal to the overall controller 150. In addition, the parameters set by the magnified image capturing controller 144 include, for example, an exposure start timing, an exposure end timing, and the like.

Figure 4:
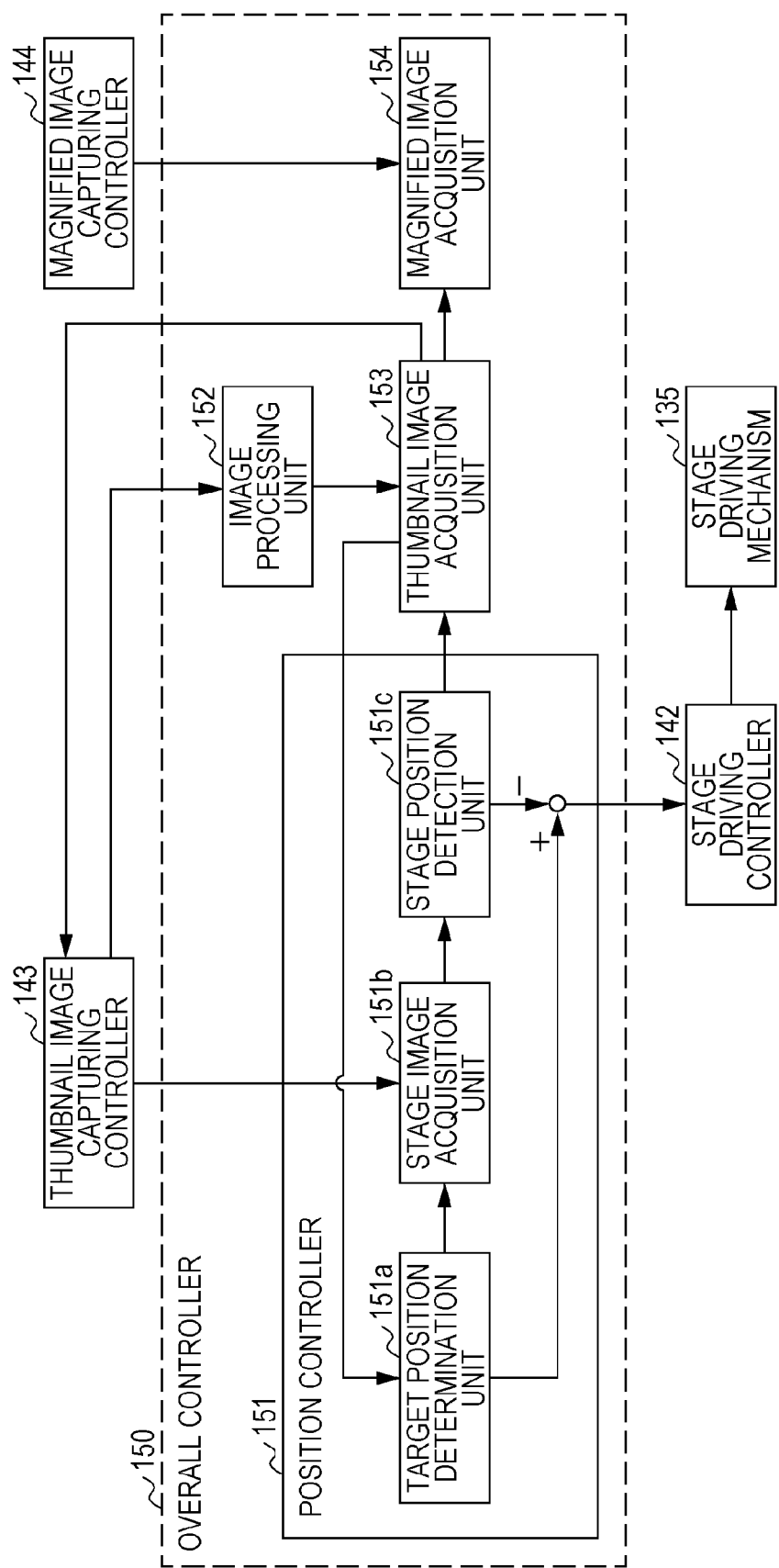
FIG. 4 is a functional block diagram illustrating functions and configurations of an overall controller.

The overall controller 150 is a processing unit which performs overall control of the microscope including the aforementioned various controllers. As illustrated in FIG. 4, the overall controller 150 includes a position controller 151, an image processing unit 152, a thumbnail image acquisition unit 153, and a magnified image acquisition unit 154.

The position controller 151 performs a position control process to move the stage 130 to a position (hereinafter, referred to as a "target position") which is set to a target. As illustrated in FIG. 4, the position controller 151 is configured to include a target position determination unit 151a, a stage image acquisition unit 151b, and a stage position detection unit 151c.

In the case where the thumbnail image is to be acquired, the target position determination unit 151a determines the target position of the stage 130 where all the portions of the preparat PRT are enclosed in the image capturing range SPR of the image capturing device 113.

The stage image acquisition unit 151b allows the illumination controller 141 to drive the light source 111 and the light source, which illuminates the markers 134a to 134d and allows the thumbnail image capturing controller 143 to acquire the stage image of the entire image capturing range SPR, where the image capturing is performed by the image capturing device 113, in a predetermined timing interval.

The stage position detection unit 151c calculates correlation values of pixels of the stage image acquired by the stage image acquisition unit 151b with respect to shape data of the markers 134a to 134d stored in advance in a HDD. The stage position detection unit 151c calculates, for example, a quadratic curve passing through the pixel of which the calculated correlation value is a maximum and the pixels before and after the pixel and detects the positions of the maximum values of the quadratic curve as the positions of the markers 134a to 134d in the stage image. For example, the stage position detection unit 151c reads a correspondence table of the positions of the markers 134a to 134d in the stage image and the positions of the markers 134a to 134d in the actual stage 130 from the HDD. Next, the stage position detection unit 151c detects the positions in the actual stage 130 corresponding to the positions of the markers 134a to 134d in the stage image from the correspondence table.

The position controller 151 calculates a difference between the target position determined by the target position determination unit 151a and the position of the stage 130 detected by the stage position detection unit 151c and outputs the difference to the stage driving controller 142. The stage driving controller 142 moves the stage 130 to the target position through a stage driving mechanism 135 according to the difference supplied from the position controller 151. In this manner, every time the position controller 151 acquires the stage image captured by the image capturing device 113, the position controller 151 detects the markers 134a to 134d shown in the stage image, detects the position of the stage 130 from the result, calculates the difference between the position of the stage 130 and the target position, and moves the stage 130 to the target position.

The image processing unit 152 determines the magnified portion image acquisition area, where the magnified image is to be acquired, from the image captured by the image capturing device 113, which is input from the thumbnail image capturing controller 143, and generates the thumbnail image 153. In the image captured by the image capturing device 113, the edge of the cover glass covering the sample and foreign materials on the slide as well as the living body sample may be shown. Therefore, in the embodiment, the image processing unit 152 removes the areas, where something other than the living body sample appears, from the image captured by the image capturing device 113 and outputs the area, where the living body sample appears, as a magnified portion image acquisition area to the thumbnail image acquisition unit 153. In other words, the image processing unit 152 functions as a magnified portion image acquisition area determination unit for detecting the edge of the cover glass from the image and determining the magnified portion image acquisition area. In addition, the image processing unit 152 also functions as a label image acquisition unit for acquiring an image of the label 161 attached to the slide glass 160 and functions as a noise removing unit for removing noise such as foreign materials on the slide glass 160.

The thumbnail image acquisition unit 153 is implemented by using, for example, a CPU, a ROM, a RAM, a communication unit, and the like. In the case where predetermined user manipulation is performed on the microscope 100, the case where the preparat PRT is mounted on the stage 130, and the like, the thumbnail image acquisition unit 153 requests the thumbnail image capturing controller 143 to capture the thumbnail image together with various setting conditions.

In addition, the thumbnail image acquisition unit 153 acquires data (hereinafter, referred to as thumbnail image data) corresponding to the thumbnail image, which are output from the thumbnail image capturing controller 143 to the image processing unit 152 to be processed, from the image processing unit 152. The thumbnail image acquisition unit 153 may store the acquired thumbnail image data in a storage unit (not shown). In addition, the thumbnail image acquisition unit 153 may output the acquired thumbnail image data through a communication unit (not shown) to an image data storage server or the like which is disposed in an external site. In other words, the thumbnail image acquisition unit 153 also functions as a thumbnail image output unit.

The magnified image acquisition unit 154 is implemented by using, for example, a CPU, a ROM, a RAM, a communication unit, and the like. In the case where predetermined user manipulation is performed on the microscope 100, the case where the capturing of the thumbnail image of a preparat PRT is ended, or the like, the magnified image acquisition unit 154 requests the magnified image capturing controller 144 to capture the magnified image together with various setting conditions.

In addition, the magnified image acquisition unit 154 acquires data (hereinafter, referred to as magnified image data) corresponding to the magnified image, which are output from the magnified image capturing controller 144. The magnified image acquisition unit 154 may store the acquired magnified image data in a storage unit (not shown). In addition, the magnified image acquisition unit 154 may output the acquired magnified image data through a communication unit (not shown) to the image data storage server or the like which is disposed in an external site.

Hereinbefore, the schematic configuration of the microscope 100 according to the embodiment is described. In the microscope 100 according to the embodiment, when the magnified portion image acquisition area where the magnified image is to be acquired is determined by the image processing unit 152 based on the thumbnail image data acquired by the thumbnail image acquisition unit 153, the area where something other than the living body sample appears is removed from the magnified portion image acquisition area. Therefore, the magnified image of only the area where the living body sample necessarily appears may be acquired, so that it is possible to reduce the time taken to acquire the magnified image or the capacity of the storage unit which stores the virtual slide. Hereinafter, the virtual slide production process by the microscope 100 will be described in detail with reference to FIG. 5.

<2. Virtual Slide Production Process>

Figure 5:
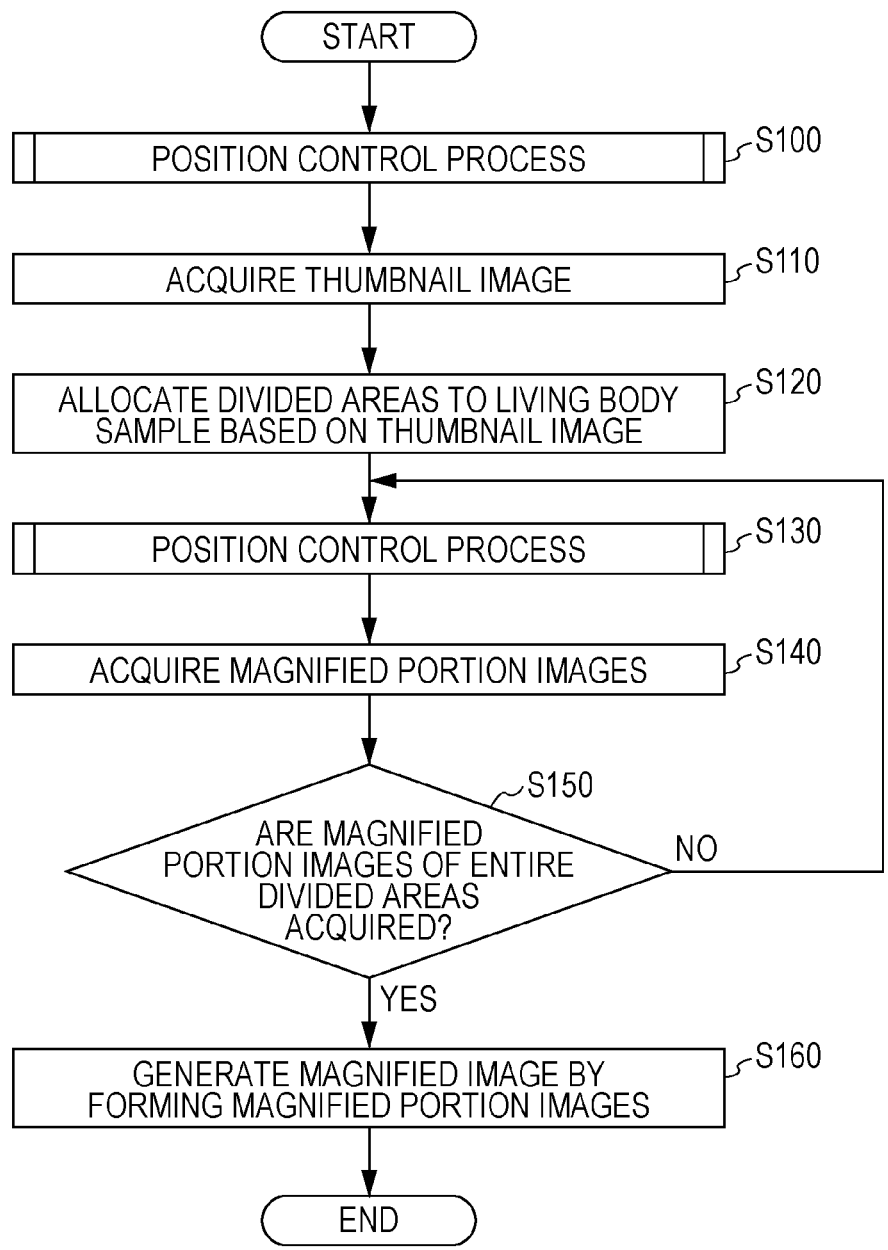
FIG. 5 is a flowchart illustrating a virtual slide production process by a microscope according to the embodiment.

FIG. 5 is a flowchart illustrating a virtual slide production process by the microscope 100. As illustrated in FIG. 5, first, the overall controller 150 performs a position control process of moving the preparat PRT to the thumbnail image capturing unit 110 in order to acquire a thumbnail image (S100). In the position control process, first, the target position determination unit 151a of the position controller 151 determines a position where the entire preparat PRT is enclosed within the image capturing range of the image capturing device 113 as a target position. Next, the stage image acquisition unit 151b acquires a stage image in the entire image capturing range, which is captured by the image capturing device 113 through the thumbnail image capturing controller 143, in a predetermined timing interval and outputs the stage image to the stage position detection unit 151c.

The stage position detection unit 151c detects the positions of the markers 134a to 134d from the stage image input from the stage image acquisition unit 151b. Next, the stage position detection unit 151c calculates a difference between the target position and the stage 130 and outputs the difference to the stage driving controller 142, so that the stage 130 may be moved through the stage driving mechanism 135 according to the difference.

If the preparat PRT is moved to the thumbnail image capturing unit 110 in Step S100, a thumbnail image is acquired by the thumbnail image capturing unit 110 (S110). In the acquisition of the thumbnail image according to the embodiment, the image processing unit 152 detects the edge of the cover glass from the image captured and acquired by the image capturing device 113 and determines the area of the image, where the edge appearing area is removed, as the magnified portion image acquisition area. Next, the thumbnail image acquisition unit 153 sets correspondence data of the magnified portion image acquisition area and the label describing the information on the sample as the thumbnail image.

Figure 6:
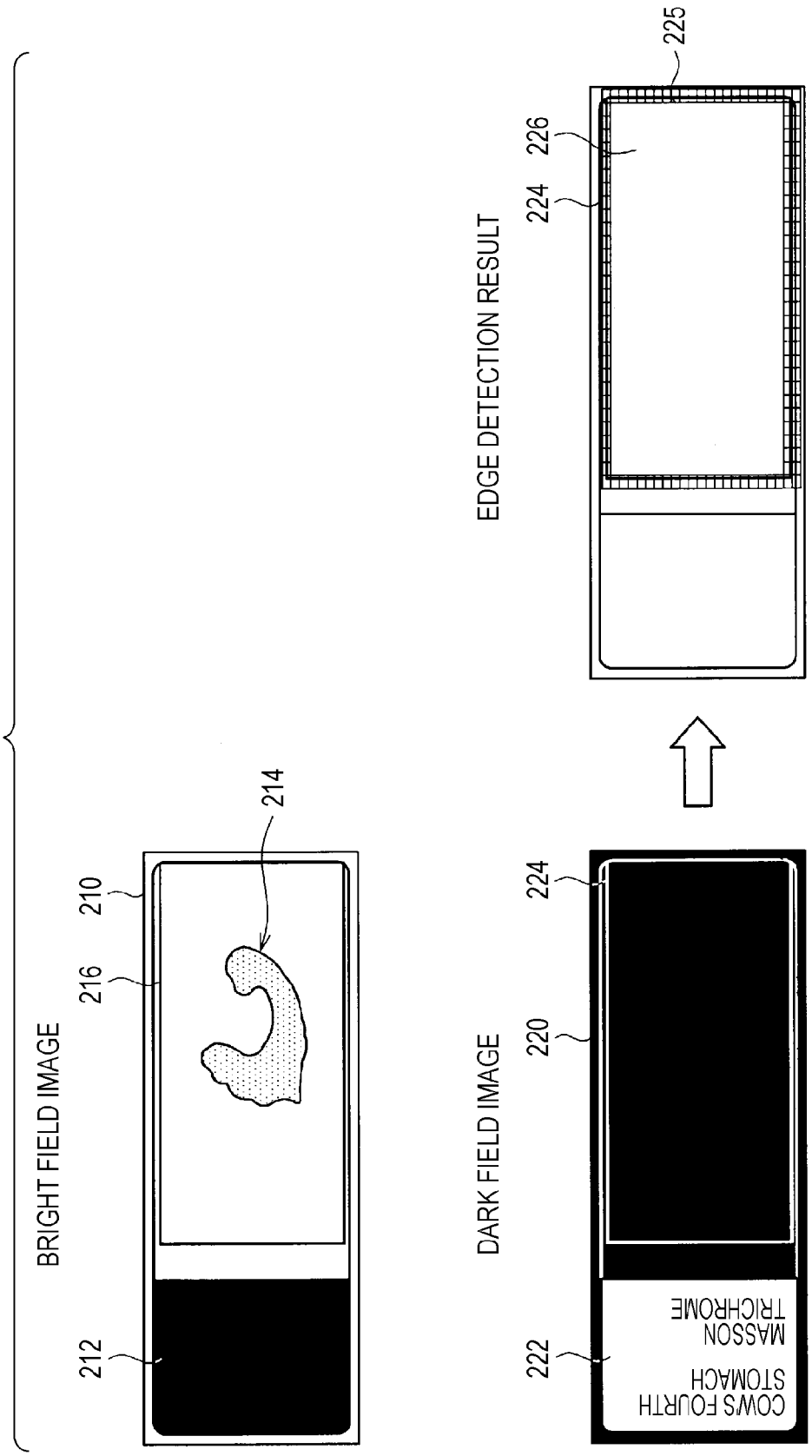
FIG. 6 is a diagram illustrating an overview of detection of an edge of a cover glass by the microscope according to the embodiment.

The thumbnail image acquisition process is described more in detail with reference to FIGS. 6 to 11. As described above, the thumbnail image capturing unit 110 includes the bright field illumination and the dark field illumination as the light source 111. With respect to the information obtained from the images captured by using the illuminations, there is a difference as illustrated in FIG. 6. In the case of using the bright field illumination, the light is illuminated on the preparat PRT from the lower portion of the preparat PRT (the opposite side of the image capturing device 113 with respect to the preparat PRT). Therefore, with respect to the portions transmitting light, a shape of the object (for example, the living body sample 214, the cover glass, the foreign materials, or the like) disposed on the preparat PRT may be acquired. However, since the portions (for example, the label 212) which do not transmit light appear dark, the written contents of the label 212 may not be visually recognized.

Figure 7:
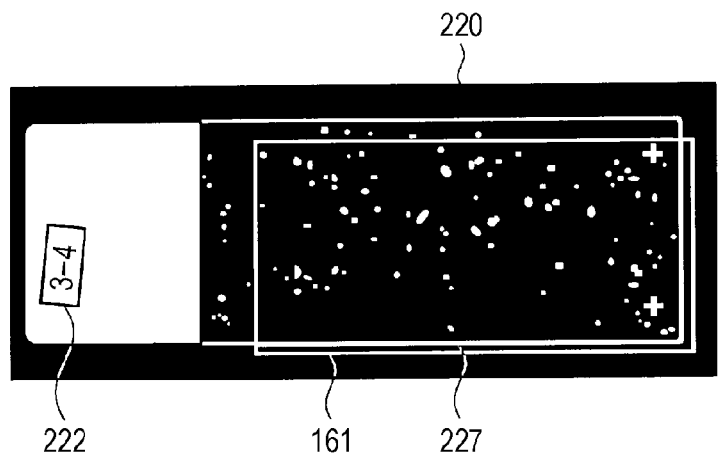
FIG. 7 is a diagram illustrating an example of a dark field image acquired by a thumbnail image capturing unit.

On the other hand, in the case of using the dark field illumination, the preparat PRT is illuminated from the upper side thereof. At this time, the information on the portion where light is scattered in the preparat PRT may be acquired from the image captured by the image capturing device 113. Since the light scattering occurs in, for example, the edge of the cover glass and the like, for example, as illustrated in the left lower side of FIG. 6, the edge 224 of the cover glass which is mounted so as to cover the living body sample on the slide appears white in the dark field image 220. In addition, as illustrated in FIG. 7 in the case where the mounting agent oozes, the mounting agent oozing area appears white. In addition, since illumination is performed from the upper side of the preparat PRT, the written contents of the label 222 may also be acquired.

Figure 8:
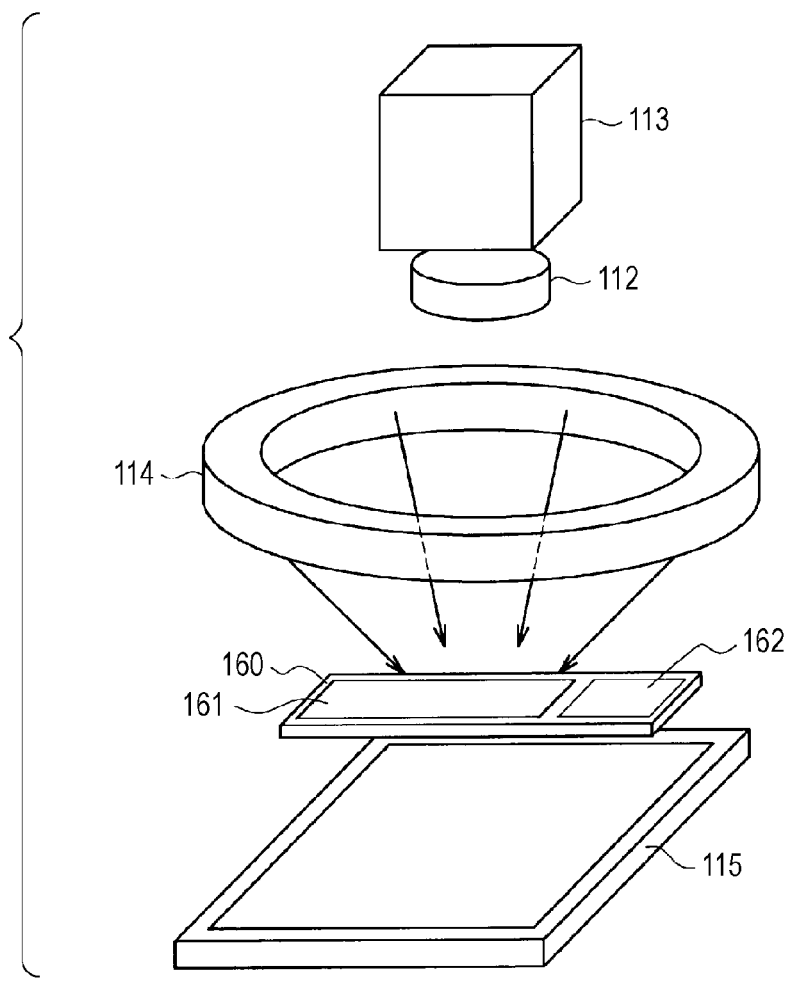
FIG. 8 is a diagram illustrating a configuration of the thumbnail image capturing unit in the case of using LED ring illumination as dark field illumination.
Figure 9:
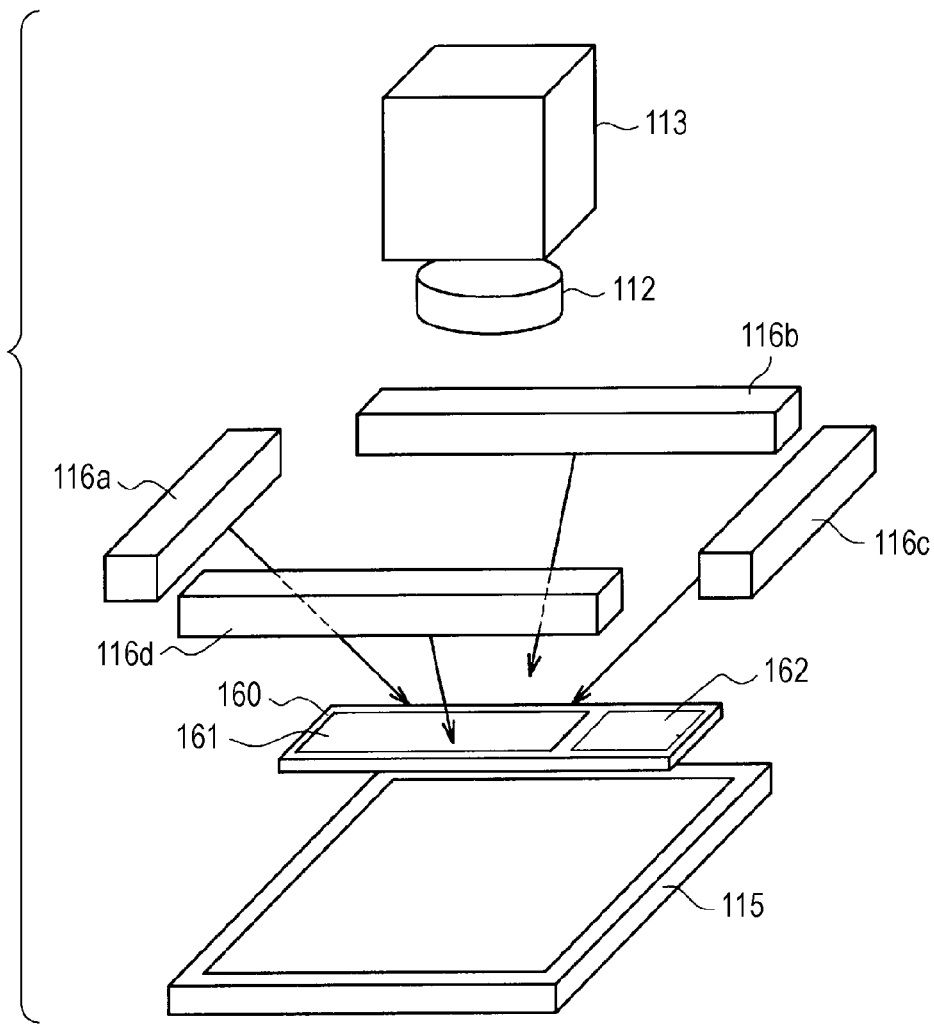
FIG. 9 is a diagram illustrating a configuration of the thumbnail image capturing unit in the case of using LED bar illumination as dark field illumination.

As illustrated in FIG. 8, for example, an LED ring illumination 114 may be used as the dark field illumination. The LED ring illumination 114 is disposed between the preparat PRT and the image capturing device 113 to illuminate light on the preparat PRT from the upper side of the preparat PRT. Alternatively, one LED bar illumination or a plurality of the LED bar illuminations may be used as the dark field illumination. For example, as illustrated in FIG. 9, four LED bar illuminations 116a to 116d are disposed along the outer periphery of the preparat PRT between the preparat PRT and the image capturing device 113 to illuminate light on the preparat PRT from the upper side of the preparat PRT. Therefore, the light is illuminated on the upper surface side of the preparat PRT, so that the edge of the cover glass or the written contents of the label may be recognized.

Figure 10:
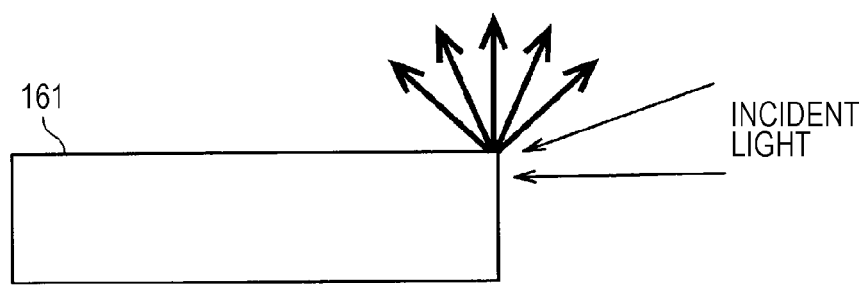
FIG. 10 is a diagram illustrating light scattering in an edge of a cover glass.

Herein, light has characteristics in that short-wavelength light is easily scattered (in other words, it has a high scattering rate) and long-wavelength light is not easily scattered (in other words, it has a low scattering rate). Scattering of which the scattering rate is varied with a wavelength is called Rayleigh scattering. In the Rayleigh scattering, the scattering rate is inversely proportional to the fourth power of the wavelength. As illustrated in FIG. 10, when the light from the dark field illumination is incident on the edge portion of the cover glass, the incident light is scattered in the edge portion. The more the light is scattered, the better the difference in the change of the scattering rate may be image-captured as light shade difference. Therefore, it is possible to clearly detect the edge portion. In this manner, since the degree of detection of the surface state or the edge portion state is changed according to the difference in the scattering rate, it is preferable that the dark field illumination is performed by using short-wavelength light having a high scattering rate (for example, blue, violet, white, and the like). In addition, although the example where the LED illumination is used as the dark field illumination is described, the embodiments of the present applicationare not limited to the example. For example, a laser may be used as the dark field illumination.

The image processing unit 152 according to the embodiment generates a thumbnail image by using the bright field image 210 and the dark field image 220 acquired by the thumbnail image capturing unit 110. The thumbnail image generation process is illustrated in FIG. 11.

Figure 11:
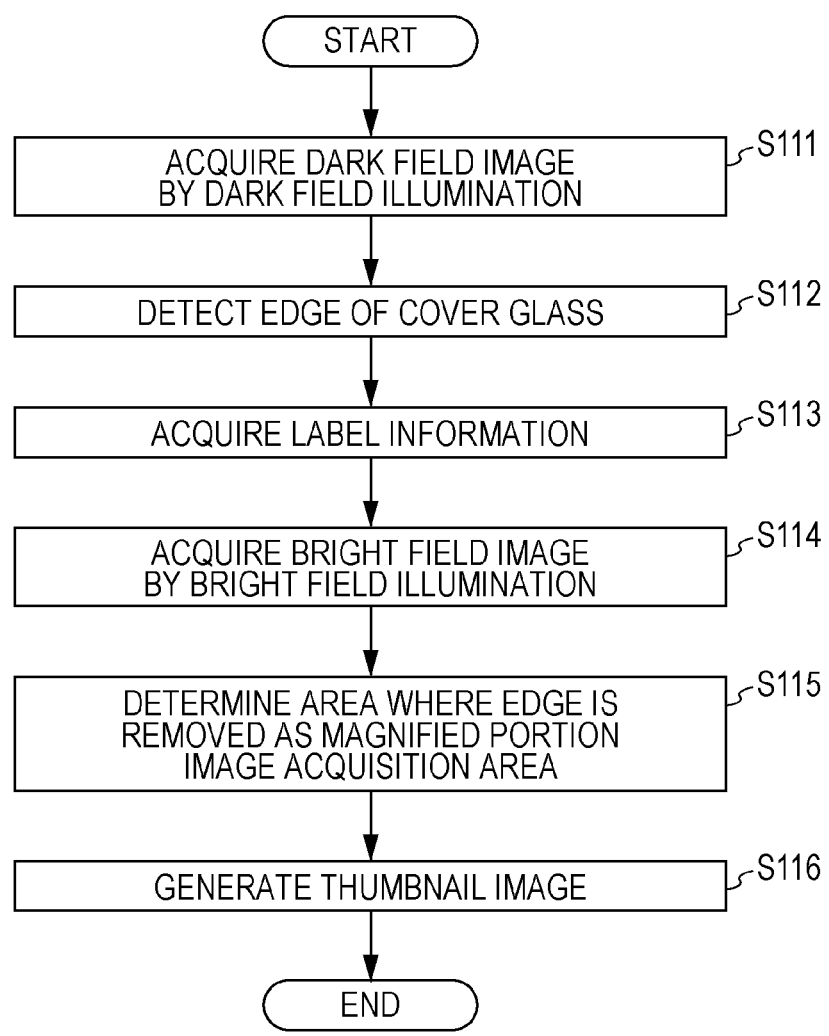
FIG. 11 is a flowchart illustrating a thumbnail image generation process according to the embodiment.

As illustrated in FIG. 11, in the thumbnail image generation process, first, a dark field image is acquired by the dark field illumination (S111). If the preparat PRT mounted on the stage 130 is moved to the image capturing position of the thumbnail image acquisition unit 110 by the stage driving controller 142, the overall controller 150 instructs the illumination controller 141 to turn on the dark field illumination. If the dark field illumination is turned on, the dark field image is acquired by the image capturing device 113. After that, the illumination controller 141 turns off the dark field illumination. The thumbnail image capturing controller 143 outputs dark field image data, which are output from the image capturing device 113, to the image processing unit 152 of the overall controller 150.

Herein, when the dark field image is acquired, in the case where the slide is tilted or in the case where there is irregularity in the thickness of the slide, the focus adjustment is difficult, so that the focus adjustment is necessarily performed when the slide for producing a virtual slide is changed. Therefore, the thumbnail image capturing unit 110 according to the embodiment may include a measuring instrument which measures the tilt or thickness of the slide.

Figure 12:
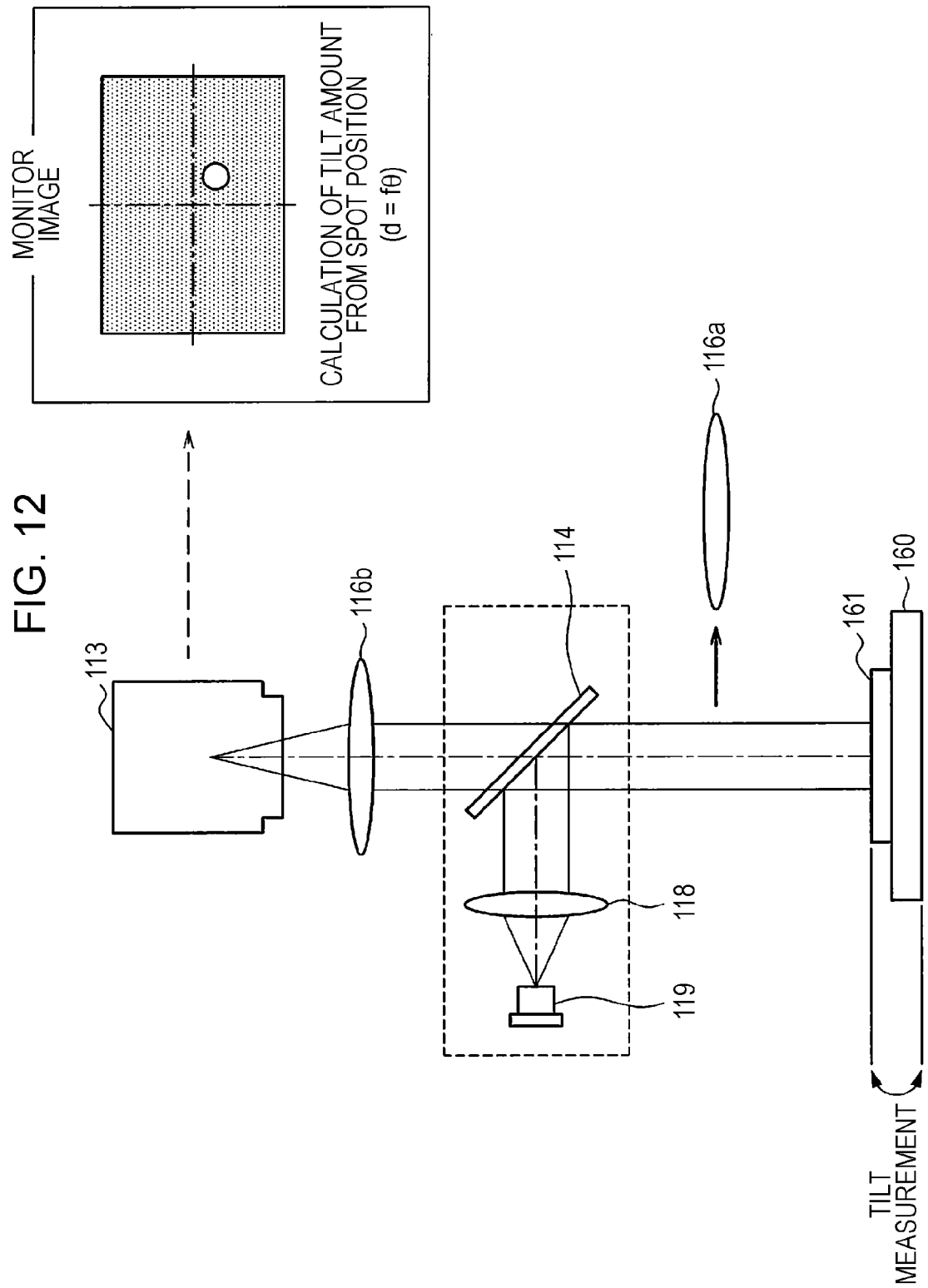
FIG. 12 is a diagram illustrating one example of a configuration of a measuring instrument capable of measuring a tilt of a slide glass in a thumbnail image capturing unit.

For example, the case of measuring the tilt angle of the slide by a measuring instrument is considered. As illustrated in FIG. 12, in the thumbnail image capturing unit 110, two image forming lenses 116a and 116b are disposed between the image capturing device 113 and the slide glass 160 on which the cover glass 161 is mounted. In addition, a mirror 114 is disposed between the image forming lenses 116a and 116b of the thumbnail image capturing unit 110. In addition, the thumbnail image capturing unit 110 includes a light source (for example, a laser diode) 119 which illuminates light on the mirror 114 from the direction substantially perpendicular to the optical axis of the image forming lenses 116a and 116b and a lens 118 which converts the light emitted from the light source 119 into parallel light.

As illustrated in FIG. 12, in order to measure the tilt angle of the slide glass 160, the slide glass 160 is image-captured by the image capturing device 113 in the state where the image forming lens 116a is temporarily receded from a straight line connecting the image capturing device 113 and the slide glass 160. If the image data acquired by the image-capturing is monitored, in the case where the slide glass 160 is tilted, it may be understood that the spot position of the image forming lens 116a in the slide glass 160 is shifted from the reference position (d=fθ). Therefore, the tilt angle of the slide is calculated, and for example, the tilt of the slide glass 160 is corrected by tilting the stage 130 in the direction where the tilt angle is canceled, so that it is possible to acquire a high-contrast observation image.

Figure 13:
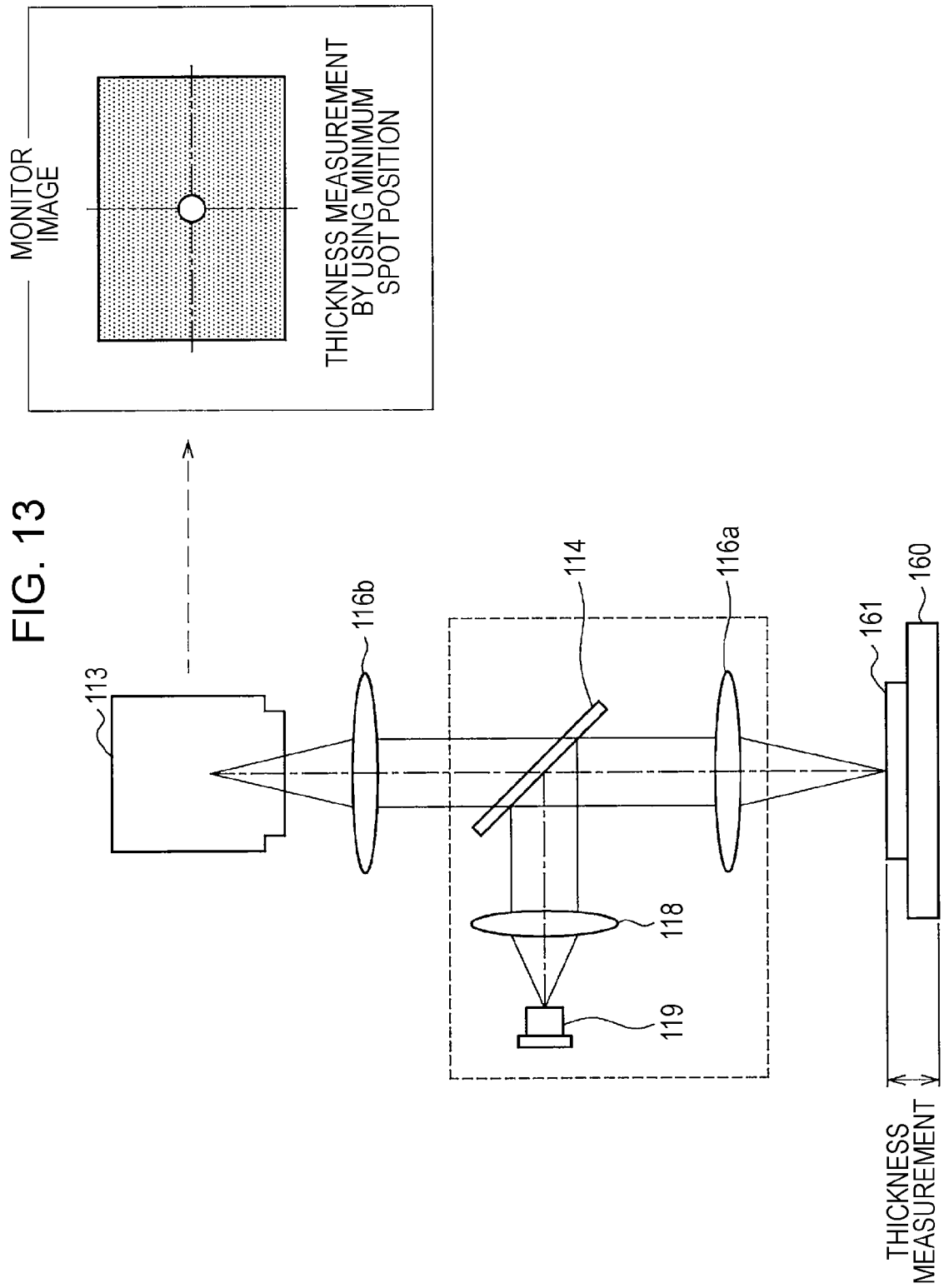
FIG. 13 is a diagram illustrating one example of a configuration of a measuring instrument capable of measuring a thickness of a slide glass in a thumbnail image capturing unit.

In addition, for example, in the case where the total thickness of the slide glass 160 and the cover glass 161 is measured by the measuring instrument, as illustrated in FIG. 13, the measuring instrument measures the position of the image forming lens 116a at the time when, for example, the image forming lens 116a is moved in the axial direction so that the spot diameter is minimized. Since the spot diameter is minimized when the focus is coincident with the surface of the cover glass 161, the position of the image forming lens 116a at the time when the spot diameter is minimized is measured, and the total thickness of the slide glass 160 and the cover glass 161 corresponding to the associated position is calculated. The relationship between the position and the total thickness of the image forming lens 116a is stored in a storage unit (not shown) in advance, so that the measuring instrument may acquire the total thickness of the slide glass 160 and the cover glass 161 from the measured position of the image forming lens 116a with reference to the storage unit.

Since the tilt or the thickness of the slide glass 160 is measured by the measuring instrument, the overall controller 150 may calculate a difference of the slide glass 160 from the reference position, where a high contrast image may be acquired, and perform correction.

Returning to FIG. 11, the image processing unit 152 detects the edge of the cover glass from the dark field image data which are input from the thumbnail image capturing controller 143 (S112). If the preparat PRT is illuminated by the dark field illumination in Step S111, light is scattered in the edge of the cover glass. For this reason, in the dark field image data, the edge of the cover glass is viewed as light. The image processing unit 152 detects a portion which appears like light in the dark field image data as the edge of the cover glass.

In addition, the image processing unit 152 may acquire written contents (label information) of a label attached to the preparat PRT from the dark field image data (S113). Since the scattered light is observed in the dark field illumination, due to the scattering of the light which is illuminated from the upper portion with respect to the label, the label information appears in the dark field image data. Therefore, the image processing unit 152 acquires the label information from the dark field image data.

If the edge of the cover glass and the label information are acquired from the dark field image data, next, the bright field image by the bright field illumination is acquired (S114). First, the overall controller 150 instructs the illumination controller 141 to turn on the bright field illumination. If the bright field illumination is turned on, the bright field image is acquired by the image capturing device 113. After that, the illumination controller 141 turns off the bright field illumination. The thumbnail image capturing controller 143 outputs the bright field image data, which are output from the image capturing device 113, to the image processing unit 152 of the overall controller 150.

For example, as illustrated in the left upper portion of FIG. 6, the objects existing on the slide glass such as the living body sample 214 or the edge of the cover glass 216 may be recognized from the bright field image data. Among the recognized objects, the object of which the image as the magnified image is to be acquired is only the living body sample 214. The other objects such as the edge of the cover glass 216 are noise and are not the object of which the magnified image is to be acquired and stored as the virtual slide. Therefore, the image processing unit 152 performs a process of determining the magnified portion image acquisition area, where the magnified image is to be acquired, by using the bright field image data and the dark field image data (S115).

More specifically, the image processing unit 152 calculates the position of the edge of the cover glass in the bright field image data from the position of the edge of the cover glass detected from the dark field image data. Next, the image processing unit 152 performs area determination by using the internal area at the position of the edge of the cover glass in the bright field image data to determine the magnified portion image acquisition area. In addition, in the case where the area determination is not properly performed or in the case where the entire internal surface of the cover glass is to be measured, a method of determining the entire internal area at the position of the edge of the cover glass in the bright field image data as the magnified portion image acquisition area may be used.

After that, the image processing unit 152 generates the thumbnail image (S116). The image processing unit 152 sets the image (that is, the image including the living body sample 214) in the magnified portion image acquisition area in the bright field image data and the image of the label 222 in the dark field image data as the thumbnail image in a correspondence manner. The generated thumbnail image may be stored in a storage unit (not shown). In this manner, in Step S110, the overall controller 150 acquires the thumbnail image through the thumbnail image capturing controller 144 and the image capturing device 113 in the state where the stage 130 is moved to the target position, and the procedure proceeds to the following Step S120.

Figure 14:
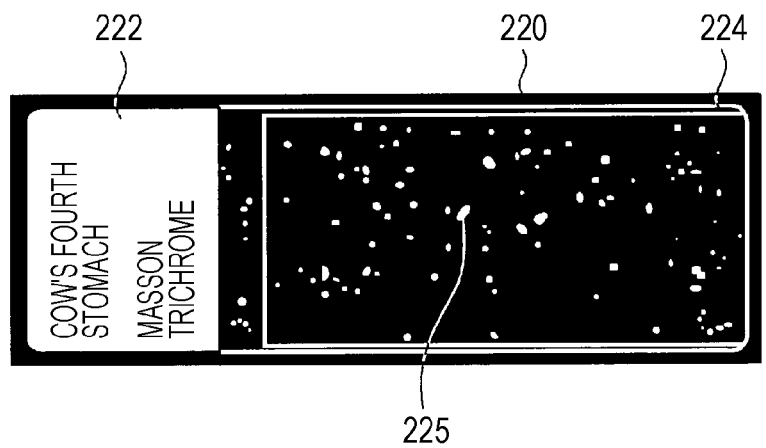
FIG. 14 is a diagram illustrating an example of dark field image data indicating foreign materials on the slide glass.

In addition, not only the edge of the cover glass 161 but also the foreign materials on the slide glass 160 may be detected from the dark field image data. FIG. 14 illustrates an example of a dark field image acquired by the thumbnail image capturing unit 110. In the dark field image 220 illustrated in FIG. 14, a label 222, an edge 224 of the cover glass, and foreign materials 225 appear. Since the foreign materials 225 are not the living body sample but noise, the information on the foreign materials may be preferably removed so as to generate the thumbnail image. Therefore, in the image processing unit 152 according to the embodiment, a difference between the bright field image data and the dark field image data is used to remove foreign materials, which appear together with the living body sample in the bright field image data, so that it is possible to more clearly show the living body sample of the thumbnail image. In addition, the image processing unit 152 may be provided with a function of counting the number of foreign materials. Therefore, a process of issuing alarm and prompting image capturing again in the case where the foreign materials, of which the number is equal to or larger than a predetermined threshold value, are detected may be employed.

Figure 15:
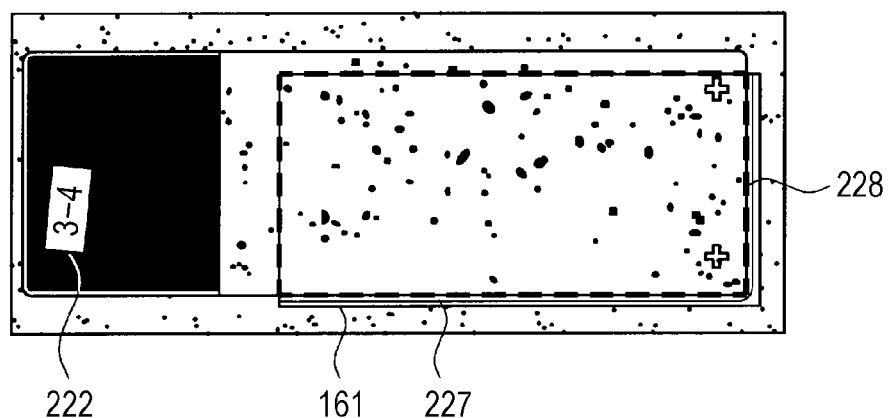
FIG. 15 is a diagram illustrating an example of a magnified portion image acquisition area specified by using the dark field image illustrated in FIG. 7.

In addition, the mounting agent, which oozes from the cover glass 161, as well as the edge of the cover glass 161 may also be detected from the dark field image data. FIG. 7 illustrates an example of the dark field image acquired by the thumbnail image capturing unit 110. In the dark field image 220 illustrated in FIG. 7, the label 222, the edge 224 of the cover glass 161, and the mounting agent 227 are shown. In the case where the cover glass 161 is relatively shifted from the slide glass 160 or in the case where the amount of the mounting agent 227 is large, the mounting agent 227 may ooze. In this case, particularly, in the case where the cover glass 161 is shifted, as illustrated in FIG. 15, the internal area of the closed area 228 surrounded by the edge 224 of the cover glass 161 and the mounting agent oozing area may be determined as the magnified portion image acquisition area.

Figure 16:
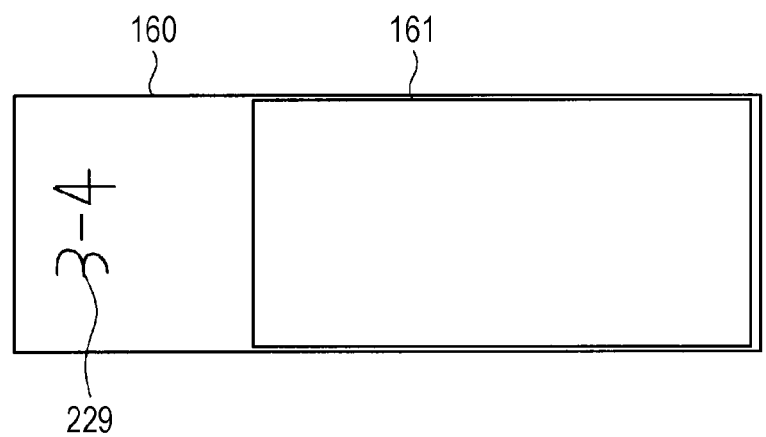
FIG. 16 is a diagram illustrating an example of a preparat where a scribed character is attached.

In addition, scratches on the cover glass 161 and the slide glass 160 as well as the edge 224 of the cover glass 161 may also be detected from the dark field image data. The scratches are not the living body sample but noise, so that information on the scratches is preferably removed in the generation of the thumbnail image. Therefore, in the image processing unit 152 according to the embodiment, a difference between the bright field image data and the dark field image data is used to remove the scratches appearing together with the living body sample in the bright field image data, so that it is possible to more clearly show the living body sample of the thumbnail image. In addition, in the case where the detected scratches are intentionally provided, for example, in the case where a scribed character 229 exists as illustrated in FIG. 16, the information may be positively used. In some cases, since the scribed character 229 is used as a substitute for the information of the label 222, the scribed character 229 may be acquired as the label information in the generation of the thumbnail image.

Returning to the description of FIG. 5, if the thumbnail image is acquired in Step S110, the divided areas are allocated to the living body sample based on the thumbnail image (S120). The overall controller 150 detects the position of the living body sample in the stage 130 based on the thumbnail image to allocate the divided areas to the living body sample. The divided areas are image capturing unit areas in which the magnified portion image is acquired by the image capturing device 124.

Next, in order to acquire the magnified portion images, the overall controller 150 perform a position control process of moving the preparat PRT to the magnified image capturing unit 120 (S130). In the position control process of Step S130, first, the target position determination unit 151a of the position controller 151 determines positions of the divided areas allocated to the living body sample based on the thumbnail image as target positions. Next, the stage image acquisition unit 151b acquires the magnified portion images of the divided areas, which are captured by the image capturing device 124 through the magnified image capturing controller 144, in a predetermined timing interval and outputs the magnified portion images to the stage position detection unit 151c (S140).

Herein, when the magnified portion image is acquired, in the case where the slide is tilted or in the case where there is irregularity in the thickness of the slide, the focus adjustment is difficult, so that the focus adjustment is necessarily performed when the slide for producing a virtual slide is changed. Therefore, similarly to the thumbnail image capturing unit 110, the magnified image capturing unit 120 according to the embodiment may also include a measuring instrument which measures the tilt or thickness of the slide.

Figure 17:
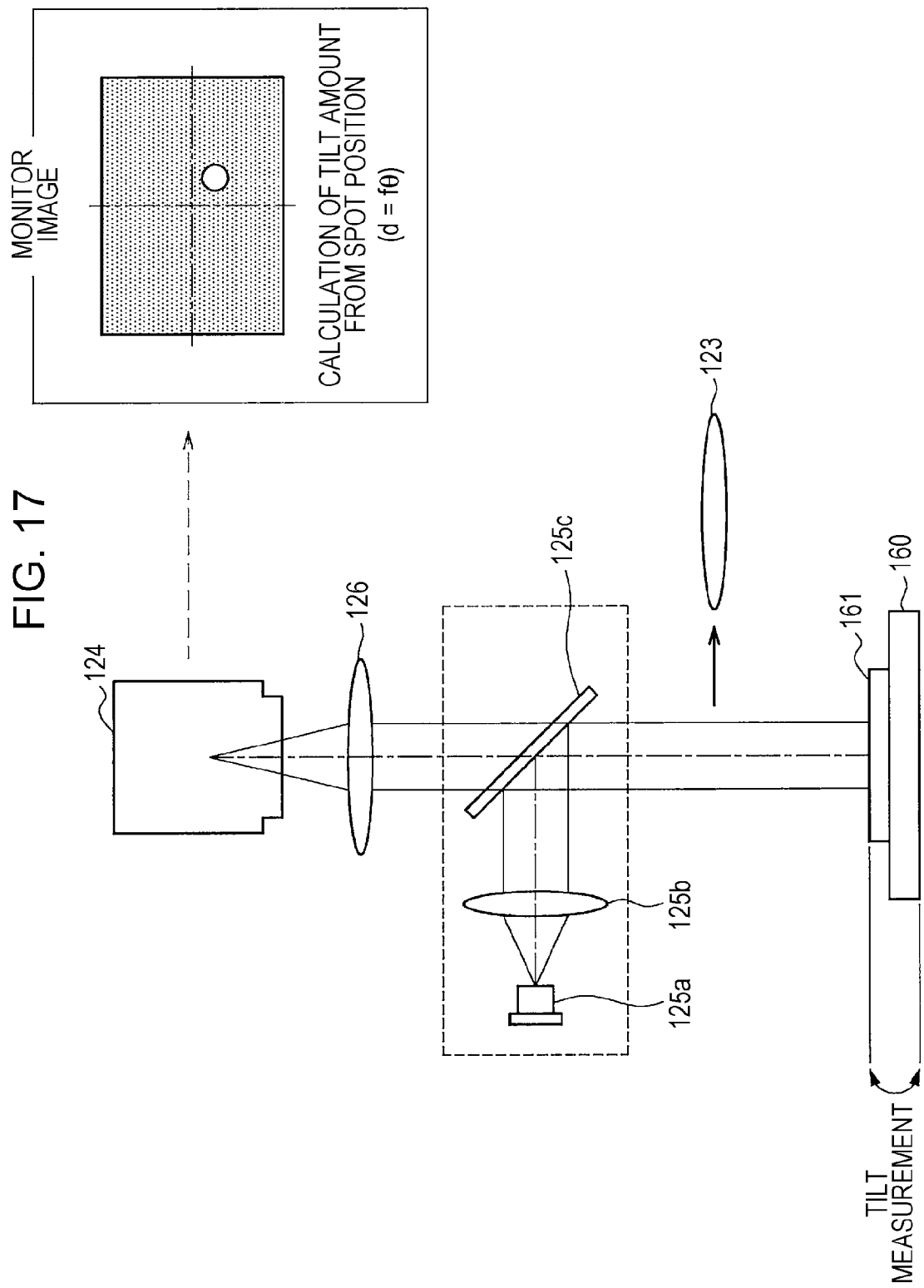
FIG. 17 is a diagram illustrating one example of a configuration of a measuring instrument capable of measuring a tilt of a slide glass in a magnified image capturing unit.

For example, the case of measuring the tilt angle of the slide by a measuring instrument is considered. As illustrated in FIG. 17, in the magnified image capturing unit 120, the object lens 123 and the image forming lens 126 are disposed between the image capturing device 124 and the slide glass 160 on which the cover glass 161 is mounted. In addition, a mirror 125c is disposed between the object lens 123 and the image forming lens 126 of the magnified image capturing unit 120. In addition, the magnified image capturing unit 120 includes a light source (for example, a laser diode) 125a which illuminates light on the mirror 125c from the direction substantially perpendicular to the optical axis of the object lens 123 and the image forming lens 126 and a lens 125b which converts the light emitted from the light source 125a into parallel light.

Similarly to FIG. 12, as illustrated in FIG. 17, in order to measure the tilt angle of the slide glass 160, the slide glass 160 is image-captured by the image capturing device 124 in the state where the object lens 123 is temporarily receded from a straight line connecting the image capturing device 124 and the slide glass 160. If the image data acquired by the image-capturing is monitored, in the case where the slide glass 160 is tilted, it may be understood that the spot position of the image forming lens 116a in the slide glass 160 is shifted from the reference position (d=fθ). Therefore, the tilt angle of the slide glass 160 is calculated, and for example, the tilt of the slide glass 160 is corrected by tilting the stage 130 in the direction where the tilt angle is canceled, so that it is possible to acquire a high-contrast observation image.

Figure 18:
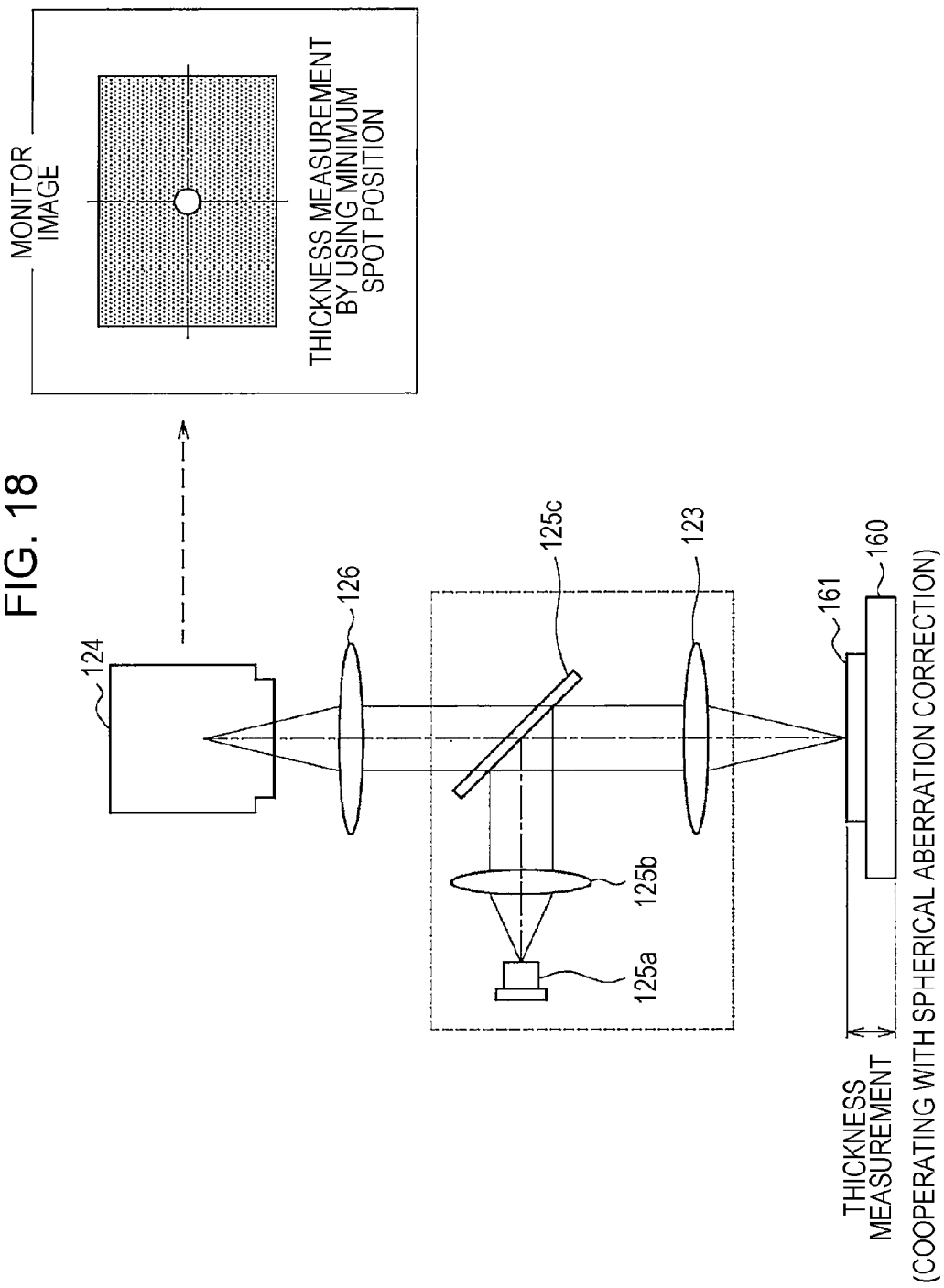
FIG. 18 is a diagram illustrating one example of a configuration of a measuring instrument capable of measuring a thickness of a slide glass in a magnified image capturing unit.

In addition, for example, in the case where the total thickness of the slide glass 160 and the cover glass 161 is measured by the measuring instrument, as illustrated in FIG. 18, the measuring instrument moves, for example, the object lens 123 in the axial direction and measures the position of the object lens 123 at the time when the spot diameter is minimized. Since the spot diameter is minimized when the focus is coincident with the surface of the cover glass 161, the position of the object lens 123 at the time when the spot diameter is minimized is measured, and the total thickness of the slide glass 160 and the cover glass 161 corresponding to the associated position is calculated. Since the relationship between the position of the object lens 123 and the total thickness is stored in a storage unit (not shown) in advance, the measuring instrument acquires the total thickness of the slide glass 160 and the cover glass 161 from the measured position of the object lens 123 with reference to the storage unit.

Since the tilt or the thickness of the slide glass 160 is measured by the measuring instrument, the overall controller 150 may calculate a difference of the slide glass 160 from the reference position where a high contrast image may be acquired and perform correction.

Returning to the description of FIG. 5, if a magnified portion image of one divided area is acquired, the overall controller 150 determines whether the magnified portion images of all the divided areas in the magnified portion image acquisition area are acquired (S150). Next, in the case where all the magnified portion images are not yet acquired, the procedure is repeated from Step S130. On the other hand, in the case where the magnified portion images of all the divided areas are determined to be acquired in Step S150, the image forming with respect to the magnified portion images is performed to generate the magnified image (S160), and the procedure is ended.

[Switching of Image Forming Lens and Cooperation of Illumination Systems]

Figure 19:
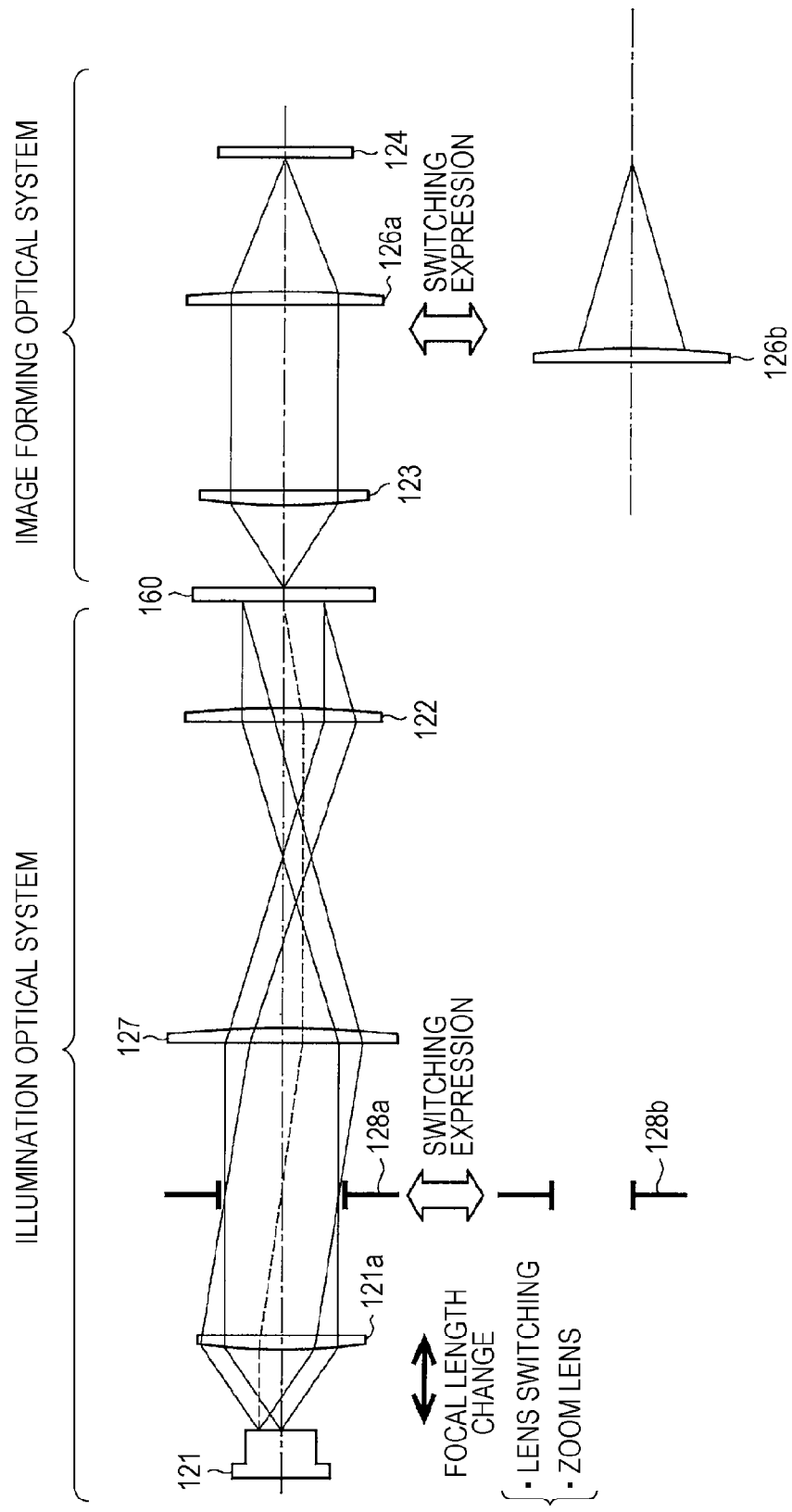
FIG. 19 is a diagram illustrating switching of an image forming lens and cooperation of an illumination system.

Herein, when the magnified image capturing unit 120 acquires the magnified image, there is a problem in that the power of the light source is lost in the field diaphragm of the illumination optical system. As illustrated in FIG. 19, the light emitted from a light source 121 is converted into parallel light by a collector lens 121*a*, passes through a field diaphragm 128*a*, passes through a field lens 127 and a condenser lens 122, and is illuminated on a slide glass 160. Next, the image capturing device 124 detects the light, which passes through the slide glass 160, passes through an object lens 123, and allows an image to be formed on an image capturing surface 124 of an image capturing device 124 by the image forming lens 126*a*, to generate the image data.

In general, the magnified image capturing unit 120 changes the magnification ratio of the acquired magnified image by switching the object lens. However, the magnified image capturing controller 144 according to the embodiment recognizes the switching of the image forming lens and changes the diaphragm size of the field diaphragm by changing the field diaphragm of the illumination optical system and the focus distance of the collector lens. Therefore, the light amount which may not pass through the field diaphragm is minimized, so that it is possible to effectively use the power of the light source 121. In addition, it is preferable that the shape of the aperture of the field diaphragm is a rectangular shape corresponding to the image capturing device size and the aspect ratio.

More specifically, according to a user command, for example, the image forming lens 126*a* may be switched into the image forming lens 126*b*, so that the magnification ratio of the acquired magnified image may be changed. In this case, the magnified image capturing controller 144 switches the field diaphragm 128*a* of the illumination optical system into the field diaphragm 128*b* corresponding to the after-switching image forming lens 126*b*. In addition, the magnified image capturing controller 144 moves the collector lens 121*a* in the axial direction of the lens according to the after-switching image forming lens 126*b* and field diaphragm 128*b* to change the focus distance of the collector lens 121*a* of the light source 121 so that the light is converted into parallel light corresponding to the diameter of the field diaphragm 128*b*.

The combination of the image forming lens, the field diaphragm, and the focus distance of the collector lens is set in advance and stored in a storage unit (not shown). If the image forming lens is switched, the magnified image capturing controller 144 acquires the field diaphragm and the focus distance of the collector lens 121*a* corresponding to the after-switching image forming lens with reference to the storage unit and performs switching of the field diaphragm and movement of the collector lens 121*a*.

The exposure time is necessarily reduced so as to obtain high throughput. Therefore, a system of effectively utilizing the power of the light source 121 is necessary. According to the embodiment, the field diaphragm and the position of the collector lens are changed according to the image forming lens, so that the power of the light source 121 may be effectively utilized without using the magnification ratio. Therefore, it is possible to perform image capturing at a high throughput.

Hereinbefore, the virtual slide production process in the microscope according to the embodiment is described. According to the embodiment, when the magnified portion image acquisition area where the magnified image is to be acquired is determined, the objects other than the living body sample are removed from the magnified portion image acquisition area by using the bright field image data and the dark field image data, so that the area where the magnified portion image is to be acquired may be limited. Therefore, since the acquisition amount of the magnified portion images where the living body sample does not appear may be reduced, the load of the magnified portion image acquisition process is reduced, so that it is possible to effectively perform the magnified image acquisition.

[Measurement of Tilt and Position of Image Capturing Device]

Figure 20:
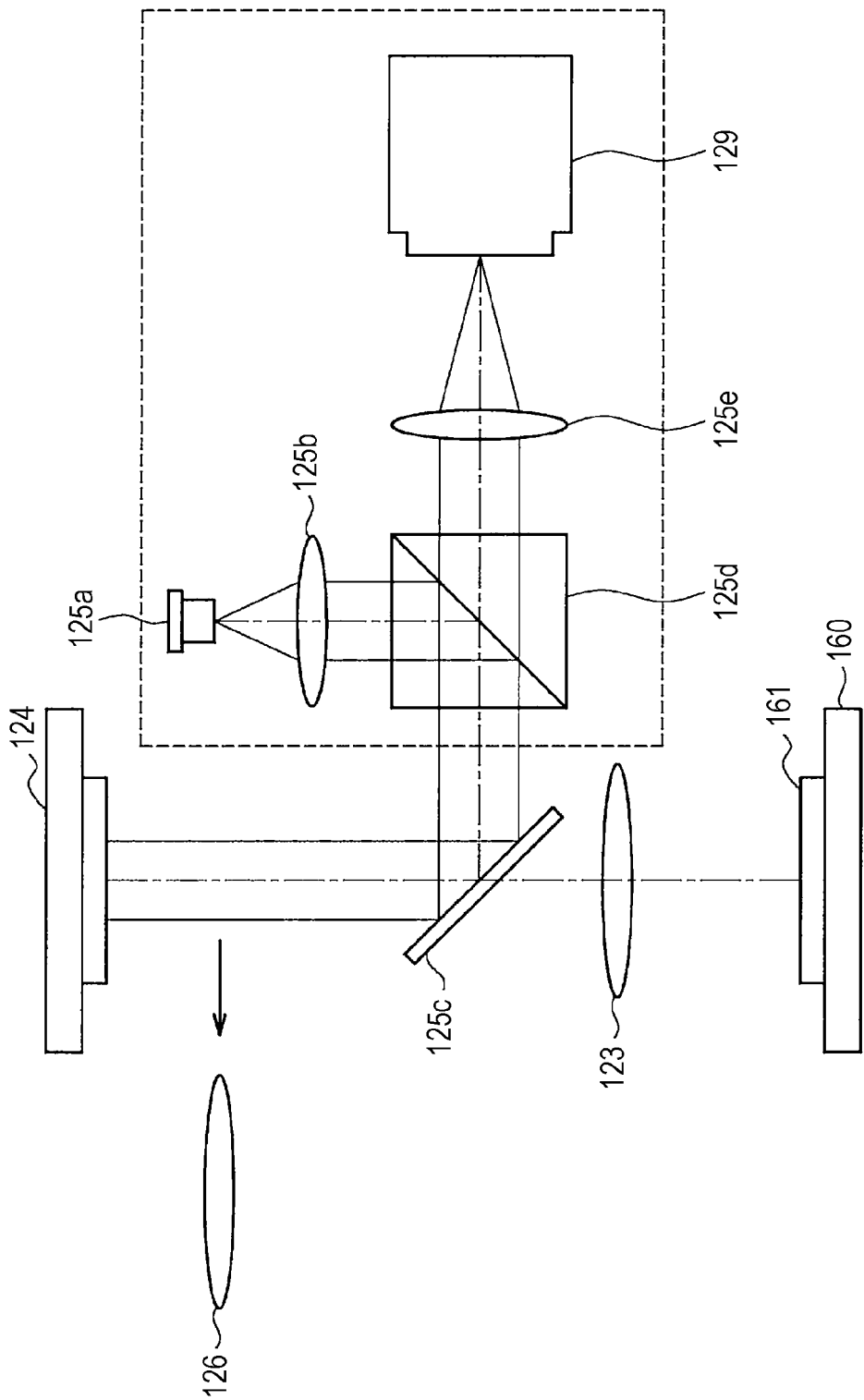
FIG. 20 is a diagram illustrating one example of a configuration of a measuring instrument capable of measuring a tilt of an image capturing device.
Figure 21:
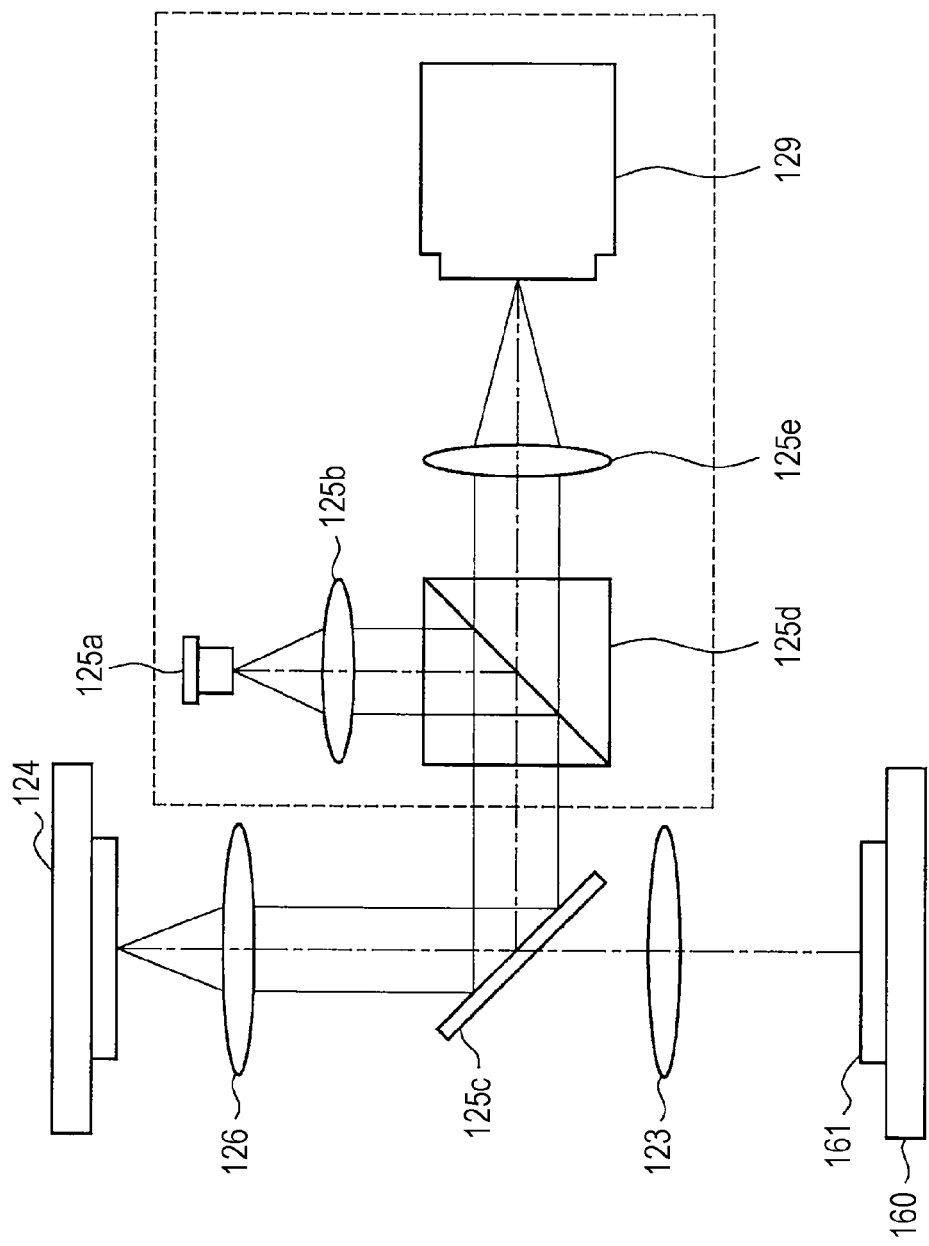
FIG. 21 is a diagram illustrating one example of a configuration of a measuring instrument capable of measuring a position of an image capturing device.
Figure 22:
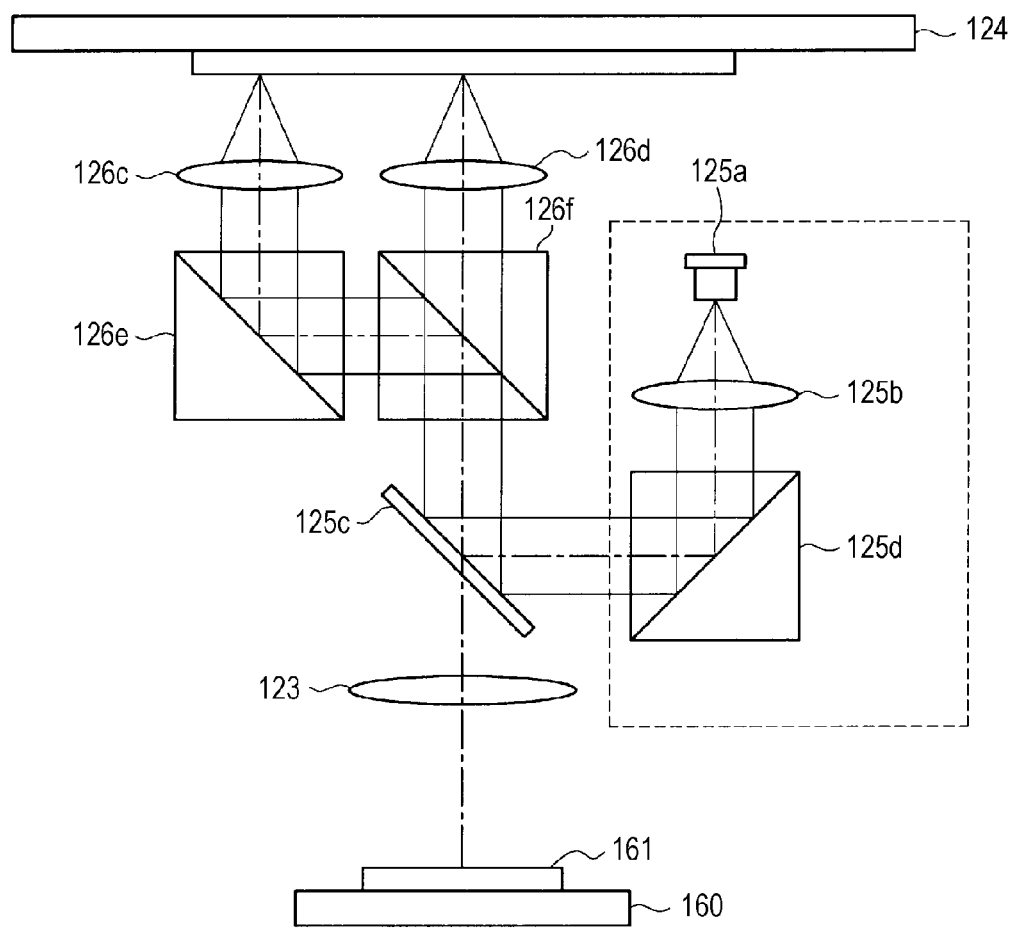
FIG. 22 is a diagram illustrating one example of a configuration of a measuring instrument capable of measuring a tilt and a position of an image capturing device.

In the above description, although the measuring instrument, which measures the tilt or thickness of the slide glass 160, included in the microscope 100 is described, similarly, the tilt or position of the image capturing device may also be measured by the measuring instrument. Hereinafter, a method of measuring the tilt or the position of the image capturing device by the measuring instrument will be described with reference to FIGS. 20 to 22. In addition, FIG. 20 is a diagram illustrating the case of measuring the tilt angle of the image capturing device. FIG. 21 is a diagram illustrating the case of measuring the position of the image capturing device. FIG. 22 is a diagram illustrating the case of simultaneously measuring the tilt angle and the position of the image capturing device. In FIGS. 20 to 22, although the cases of measuring the tilt or the position of the image capturing device 124 of the magnified image capturing unit 120 are described, with respect to the image capturing device 113 of the thumbnail image capturing unit 110, the tilt or the position of the image capturing device 113 may also be measured by the same method.

First, the case of measuring the tilt angle of the image capturing device 124 is considered. As illustrated in FIG. 20, an object lens 123 and an image forming lens 126 are disposed between the image capturing device 124 of the magnified image capturing unit 120 and the slide glass 160 on which the cover glass 161 is mounted. In addition, a mirror 125*c* is disposed between the object lens 123 and the image forming lens 126 of the magnified image capturing unit 120. In addition, a light source (for example, a laser diode) 125*a* and a lens 125*b* which changes light emitted from the light source 125*a* into parallel light are disposed in the magnified image capturing unit 120. The light changed into parallel light by the lens 125*b* is illuminated on the mirror 125*c* from the direction substantially perpendicular to optical axes of the object lens 123 and the image forming lens 126 by the beam splitter 125*d*. In addition, an image capturing device 129 and an image forming lens 125*e* which focuses light on the image capturing device 129 are disposed in the side opposite to the mirror 125*c* with respect to the beam splitter 125*d*.

As illustrated in FIG. 20, in order to measure the tilt angle of the image capturing device 124, the slide glass 160 is image-captured by the image capturing device 124 in the state where the image forming lens 126 is temporarily receded from a straight line connecting the image capturing device 124 and the slide glass 160. If the image data acquired by the image-capturing is monitored, in the case where the slide glass 160 is tilted, it may be understood that the spot position of the image forming lens 116*a* in the slide glass 160 is shifted from the reference position (d=fθ). Therefore, the tilt angle of the image forming lens 126 is calculated, and for example, the tilt is corrected by tilting the image capturing device 124 in the direction where the tilt angle is canceled, so that it is possible to acquire a high-contrast observation image.

In addition, for example, in the case where the axial direction position of the image capturing device 124 is measured by the measuring instrument, as illustrated in FIG. 21, the measuring instrument moves, for example, the image forming lens 126 or the image capturing device 124 in the axial direction. Next, since the spot diameter is minimized when the focus is coincident with the surface of the cover glass 161, the position of the image capturing device 123 at the time when the spot diameter is minimized is measured. The image forming lens 126 or the image capturing device 124 is moved to the position where the spot diameter is minimized, so that the overall controller 150 may calculate a difference of the image capturing device 123 from the reference position, where a high contrast image may be acquired, and perform correction.

In addition, as illustrated in FIG. 22, the tilt and the position of the image capturing device 124 may be simultaneously measured. In this case, as illustrated in FIG. 22, image forming lenses 126c and 126d and beam splitters 126e and 126f are disposed on an optical path between the image capturing device 124 and the mirror 125c. A portion of the light guided through the mirror 125c from the light source 125a is guided to the image forming lens 126d by the beam splitter 126f to allow an image to be formed on the image capturing device 124. In addition, other portions of the light are guided by the beam splitter 126f to the beam splitter 126e and further guided by the beam splitter 126e to the image forming lens 126c to allow an image to be formed on the image capturing device 124.

In the magnified image capturing unit 120 having the configuration, for example, after one of the image forming lenses 126c and 126d (for example, the image forming lens 126c) is receded from the optical path, the image capturing device 124 is moved in the axial direction. The difference with respect to the reference position of the spot diameter and the size of the spot diameter are recognized from the acquired image data. Therefore, since the tilt or position of the image capturing device 124 may be simultaneously measured, it is possible to effectively perform the task.

<3. Example of Hardware Configuration>

Figure 23:
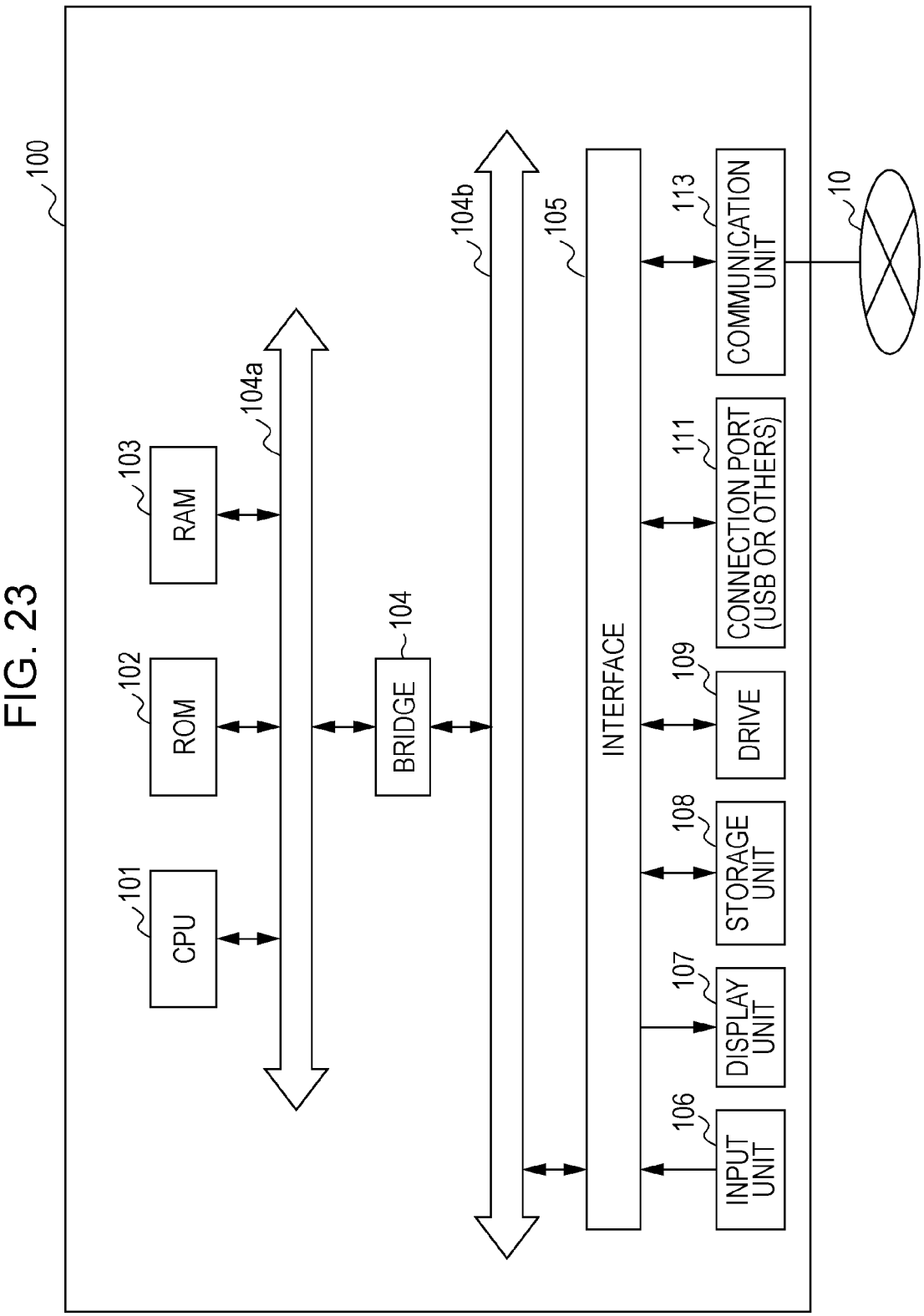
FIG. 23 is a block diagram illustrating an example of a hardware configuration of an overall controller.
Figure 24:
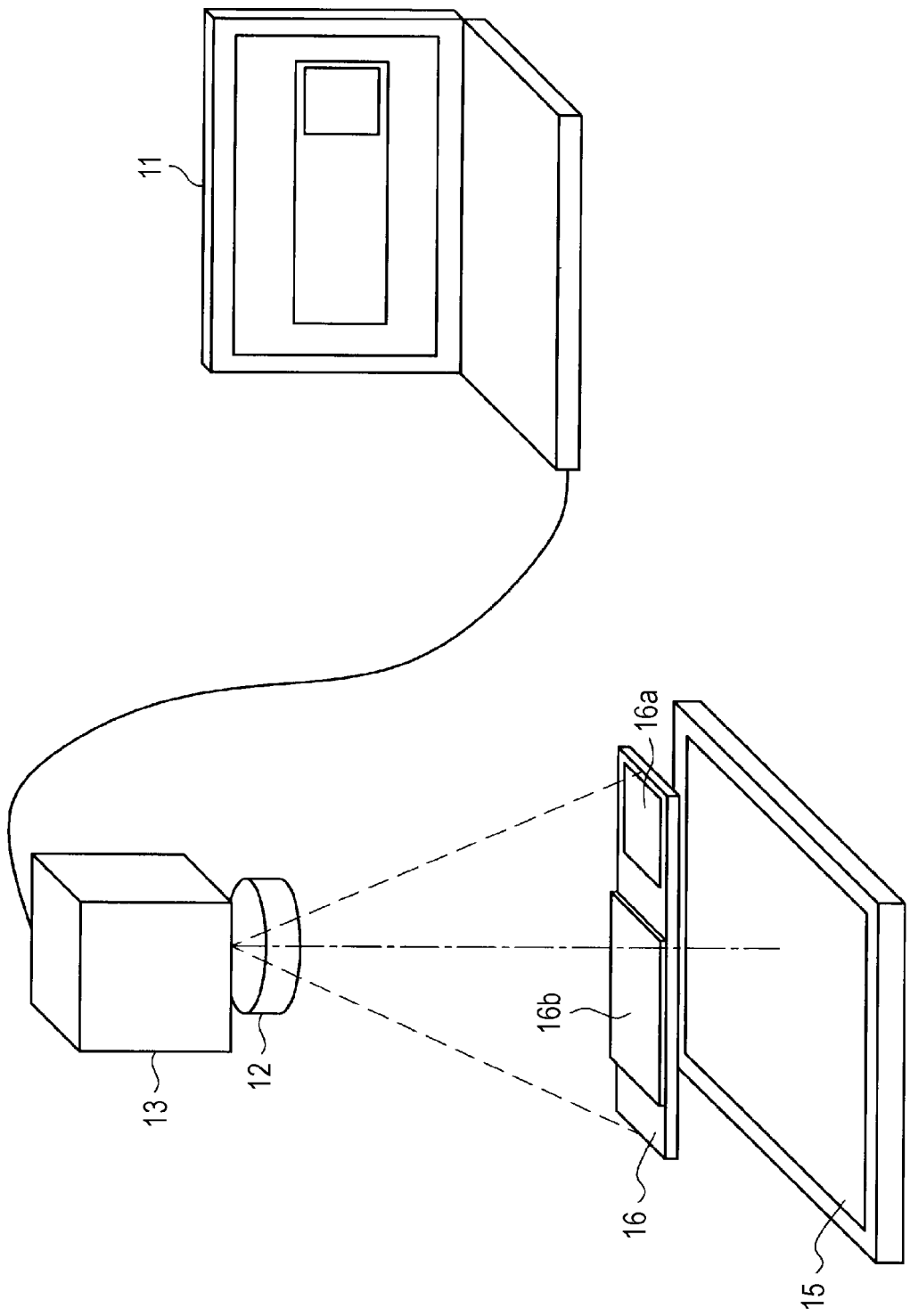
FIG. 24 is a diagram illustrating a schematic configuration of a virtual slide apparatus in the related art.
Figure 25:
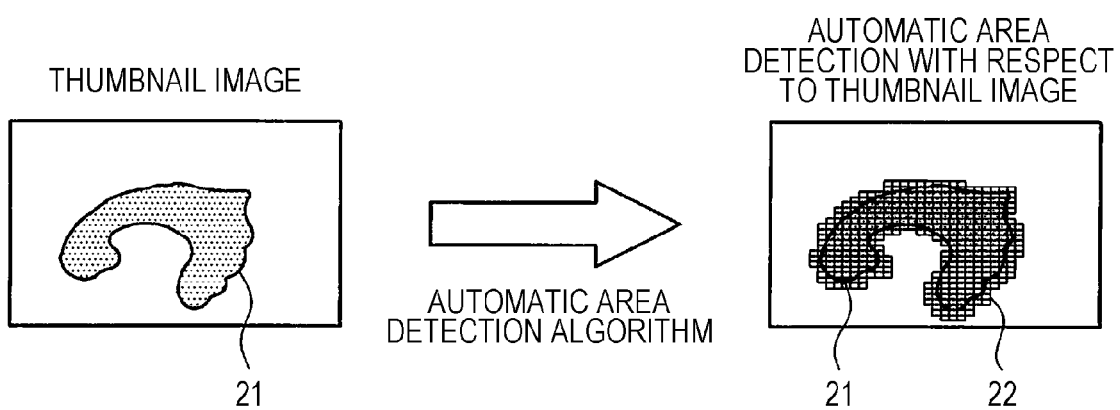
FIG. 25 is a diagram illustrating a state where an area in which a high-magnification image is automatically acquired from a thumbnail image is detected by using an automatic area detection algorithm.
Figure 26:
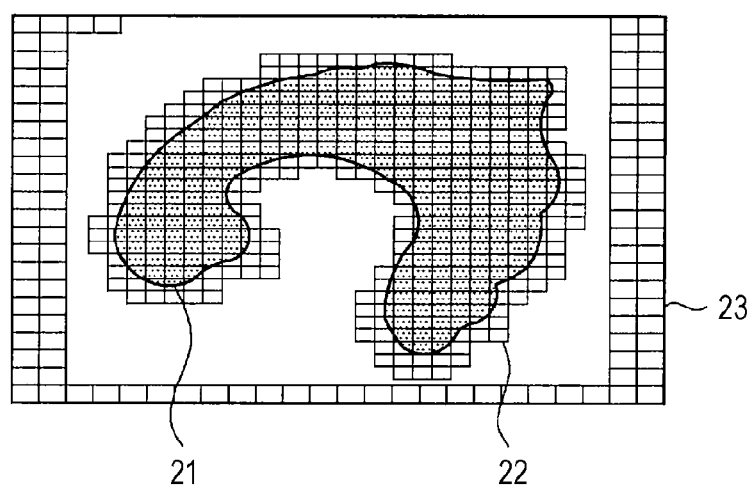
FIG. 26 is a diagram illustrating a state where an edge of the cover glass in a thumbnail image is erroneously recognized as an area in which a high-magnification image is acquired.

The processes performed by the overall controller 150 of the microscope 100 according to the embodiment may be performed by hardware or software. In this case, as illustrated in FIG. 23, the overall controller 150 may be configured as a computer. Hereinafter, one example of a hardware configuration of the overall controller 150 according to the embodiment will be described with reference to FIG. 23.

As described above, the overall controller 150 according to the embodiment may be implemented by a processing unit such as a computer. As illustrated in FIG. 3, the overall controller 150 includes a CPU (Central Processing Unit) 101, a ROM (Read Only Memory) 102, a RAM (Random Access Memory) 103, and a host bus 104a. In addition, the overall controller 150 includes a bridge 104, an external bus 104b, an interface 105, an input unit 106, an output unit 107, a storage unit (HDD) 108, a drive 109, a connection port 111, and a communication unit 113.

The CPU 101 functions as a calculation processing unit and a control unit to control overall operations of the overall controller 150 according to various programs. In addition, the CPU 101 may be a microprocessor. The ROM 102 stores programs, calculation parameters, and the like used by the CPU 101. The RAM 103 temporarily stores programs used in the execution of the CPU 101, parameters appropriately changed in the execution, and the like. These components are connected to each other by a host bus 104a which is configured with a CPU, a bus, and the like.

The host bus 104a is connected to an external bus 104b such as a PCI (Peripheral Component Interconnect/Interface) bus through the bridge 104. In addition, the host bus 104a, the bridge 104, and the external bus 104b are not necessarily configured to be separated from each other, but these functions may be embedded in one bus.

The input unit 106 is configured to include an input device such as a mouse, a keyboard, a touch panel, a button, a microphone, a switch, and a lever, through which the user inputs information, an input control circuit which generates an input signal based on the user input and outputs the input signal to the CPU 101, and the like. The output unit 107 includes, for example, a display unit such as a liquid crystal display (LCD) apparatus, an OLED (Organic Light Emitting Diode) apparatus, and a lamp and an audio output apparatus such as a speaker.

The storage unit 108 is an example of the storage unit of the overall controller 150 and is a unit for storing data. The storage unit 108 may include a storage medium, a recording unit for recording data on the storage medium, a reading unit for reading data from the storage medium, an erasing unit for erasing data recorded in the storage medium, and the like. The storage unit 108 is configured, for example, as an HDD (Hard Disk Drive). The storage unit 108 drives a hard disk to store programs executed by the CPU 101 or various data.

The drive 109 is a reader/writer for a storage medium and is embedded in or externally attached to the overall controller 150. The drive 109 reads information recorded in a mounted removable recording media such as a magnetic disc, an optical disc, a magneto optical disc, or a semiconductor memory and output the information to the RAM 103.

The connection port 111 is an interface connected to an external apparatus and is an external apparatus connection port capable of transmitting data, for example, through an USB (Universal Serial Bus) or the like. In addition, the communication unit 113 is a communication interface which is configured with a communication device for connection to, for example, the communication network 10 or the like. In addition, the communication unit 113 may be a communication unit adapted to a wireless LAN (Local Area Network), a communication unit adapted to a wireless USB, or a wire communication unit which performs wire communication.

For example, in the aforementioned embodiment, although the bright field image data is acquired after acquisition of the dark field image data when the thumbnail image is to be generated, the present applicationis not limited to the example. For example, after acquisition of the bright field image data, the dark field image data may be acquired.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A microscope comprising:

dark field illumination and bright field illumination which illuminate a preparat where a sample mounted on a slide glass is covered with a cover glass and a mounting agent;

an image capturing unit which acquires a dark field image by image-capturing the preparat illuminated by the dark field illumination and which acquires a bright field image by image-capturing the preparat illuminated by the bright field illumination; and a magnified portion image acquisition area determination unit which detects a mounting agent oozing area of the cover glass in the preparat based on the dark field image and the bright field image acquired by the image capturing unit and determines an internal area of the detected mounting agent oozing area as a magnified portion image acquisition area of the sample; and wherein the magnified portion image acquisition area determination unit calculates a position of the mounting agent oozing area, which indicates the dark field image, and determines the entire surface of an internal area at a position in the bright field image corresponding to the position of the mounting agent oozing area, which is calculated from the dark field image, as the magnified portion image acquisition area.

2. A microscope comprising:

dark field illumination and bright field illumination which illuminate a preparat where a sample mounted on a slide glass is covered with a cover glass and a mounting agent;

an image capturing unit which acquires a dark field image by image-capturing the preparat illuminated by the dark field illumination and which acquires a bright field image by image-capturing the preparat illuminated by the bright field illumination; and a magnified portion image acquisition area determination unit which detects a mounting agent oozing area of the cover glass in the preparat based on the dark field image and the bright field image acquired by the image capturing unit and determines an internal area of the detected mounting agent oozing area as a magnified portion image acquisition area of the sample; and wherein the magnified portion image acquisition area determination unit calculates a position of the mounting agent oozing area, which indicates the dark field image, performs area determination on an internal area at a position in the bright field image corresponding to the position of the mounting agent oozing area, which is calculated from the dark field image, and determines a result of the area determination as the magnified portion image acquisition area.

3. The microscope according to claim 1, further comprising:

a label image acquisition unit which acquires a label image of a label indicating information on the sample, which is attached to the slide glass, from the dark field image; and a thumbnail image output unit which outputs the image in the sample acquisition area of the bright field image and the label image in a correspondence manner.

4. The microscope according to claim 1, further comprising a noise removing unit which removes noise in the magnified portion image acquisition area based on difference information between the dark field image and the bright field image.

5. The microscope according to claim 1, wherein the dark field illumination is an LED illumination.

6. The microscope according to claim 1, wherein the dark field illumination is a laser.

7. An area determination method comprising:

acquiring a dark field image by image-capturing a preparat which is illuminated by dark field illumination and where a sample mounted on a slide glass is covered with a cover glass and a mounting agent;

acquiring a bright field image by image-capturing the preparat which is illuminated by bright field illumination;

detecting a mounting agent oozing area in the preparat based on the dark field image; and determining the entire surface of an internal area of the detected mounting agent oozing area in the bright field image as a magnified portion image acquisition area of the sample.

8. An area determination method comprising:

acquiring a dark field image by image-capturing a preparat which is illuminated by dark field illumination and where a sample mounted on a slide glass is covered with a cover glass and a mounting agent;

acquiring a bright field image by image-capturing the preparat which is illuminated by bright field illumination;

detecting a mounting agent oozing area in the preparat based on the dark field image; and performing area determination on an internal area of the detected mounting agent oozing area in the bright field image and determining a result of the area determination as a magnified portion image acquisition area of the sample.

9. The microscope according to claim 2, further comprising:

a label image acquisition unit which acquires a label image of a label indicating information on the sample, which is attached to the slide glass, from the dark field image; and a thumbnail image output unit which outputs the image in the sample acquisition area of the bright field image and the label image in a correspondence manner.

10. The microscope according to claim 2, further comprising a noise removing unit which removes noise in the magnified portion image acquisition area based on difference information between the dark field image and the bright field image.

11. The microscope according to claim 2, wherein the dark field illumination is an LED illumination.

12. The microscope according to claim 2, wherein the dark field illumination is a laser.

* * * * *